US012600231B2

(12) United States Patent
Kamiya et al.

(10) Patent No.: US 12,600,231 B2
(45) Date of Patent: Apr. 14, 2026

(54) VEHICLE DISPLAY SYSTEM, VEHICLE DISPLAY METHOD, AND STORAGE MEDIUM STORING VEHICLE DISPLAY PROGRAM

(71) Applicant: DENSO CORPORATION, Kariya-city (JP)

(72) Inventors: Akira Kamiya, Kariya-city (JP); Kiyotaka Taguchi, Kariya-city (JP); Yasuhiko Joho, Kariya-city (JP); Hiroyuki Mimura, Kariya-city (JP); Toshinori Mizuno, Kariya-city (JP)

(73) Assignee: DENSO CORPORATION, Kariya-city (JP)

( * ) Notice: Subject to any disclaimer, the term of this patent is extended or adjusted under 35 U.S.C. 154(b) by 233 days.

(21) Appl. No.: 18/488,688

(22) Filed: Oct. 17, 2023

(65) Prior Publication Data

US 2024/0042858 A1      Feb. 8, 2024

Related U.S. Application Data

(63) Continuation of application No. PCT/JP2022/015568, filed on Mar. 29, 2022.

(30) Foreign Application Priority Data

Apr. 23, 2021      (JP) ................................. 2021-073380

(51) Int. Cl.
  *B60K 35/00*      (2024.01)
  *B60K 35/28*      (2024.01)
  *B60K 35/29*      (2024.01)

(52) U.S. Cl.
  CPC .............. *B60K 35/00* (2013.01); *B60K 35/28* (2024.01); *B60K 35/29* (2024.01); *B60K 2360/16* (2024.01); *B60K 2360/182* (2024.01)

(58) Field of Classification Search
  CPC ........ B60K 35/00; B60K 35/28; B60K 35/29; B60K 2360/16; B60K 2360/182;
(Continued)

(56) References Cited

U.S. PATENT DOCUMENTS

2002/0021296 A1      2/2002   Tsuji et al.
2012/0133674 A1      5/2012   Takishita et al.

FOREIGN PATENT DOCUMENTS

EP           2121372 B1 * 11/2010   ............. B60K 35/81
JP       2001184187 A      7/2001
(Continued)

*Primary Examiner* — Rodney A Butler
(74) *Attorney, Agent, or Firm* — Harness, Dickey & Pierce, P.L.C.

(57)                ABSTRACT

A setting unit is configured to, when the image content is to be displayed across the display screens of the plurality of display devices with the non-display area therebetween, set a display area including a duplicated area in which the image content is partially duplicated and to be displayed on the display screens of the plurality of display devices. A determination unit is configured to determine whether the image content includes a specific content represented by character/symbol information or image-recognized character/symbol information. A duplicated display processing unit is configured to, on determination of the determination unit that the image content includes the specific content, set a duplication width of the duplicated area based on a width of the specific content and display the image content of the duplicated area on the display screens of the plurality of display devices.

6 Claims, 18 Drawing Sheets

(58) Field of Classification Search
CPC .......... B60K 35/22; B60R 11/02; G09G 5/00;
G09G 5/36
See application file for complete search history.

(56)                   References Cited

FOREIGN PATENT DOCUMENTS

| | | | |
|---|---|---|---|
| JP | 2012243073 | A | 12/2012 |
| JP | 2015146027 | A | 8/2015 |
| JP | 2020008740 | A | 1/2020 |

* cited by examiner

VEHICLE DISPLAY SYSTEM, VEHICLE DISPLAY METHOD, AND STORAGE MEDIUM STORING VEHICLE DISPLAY PROGRAM

CROSS REFERENCE TO RELATED APPLICATION

The present application is a continuation application of International Patent Application No. PCT/JP2022/015568 filed on Mar. 29, 2022, which designated the U.S. and claims the benefit of priority from Japanese Patent Application No. 2021-073380 filed on Apr. 23, 2021. The entire disclosures of all of the above applications are incorporated herein by reference.

TECHNICAL FIELD

The present disclosure relates to a vehicle display system, a vehicle display method, and a storage medium storing a vehicle display program.

BACKGROUND

In recent years, displays such as liquid crystal displays and organic EL displays are required to be enlarged so that a large amount of information can be viewed at once.

SUMMARY

According to an aspect of the present disclosure, a vehicle display system configured to display a unitary image content on display screens of a plurality of display devices arranged side by side with a non-display area therebetween.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1A:
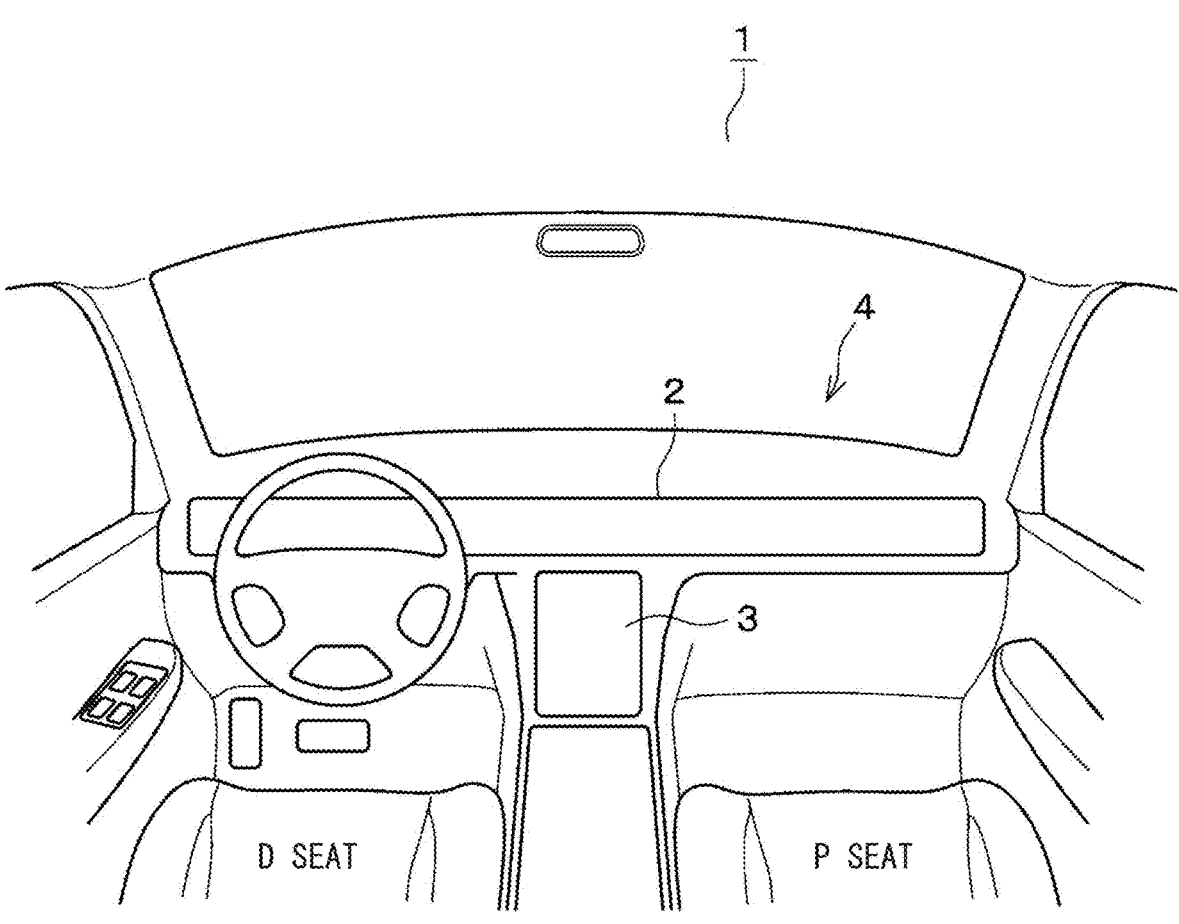
FIG. 1A is a diagram of an appearance configuration of a cockpit system in a first embodiment.

Hereinafter, examples of the present disclosure will be described.

According to an example of the present disclosure, a display device, such as a liquid crystal display and an organic EL display is used to enable viewing of a large amount of information. On the other hand, there is also a demand for displaying one large image.

According to an example of the present disclosure, one image is divided and displayed using two display units. In order to eliminate a sense of incongruity in human vision, when displaying one image using two display devices respectively provided with display units, it is assumable to install an auxiliary display device at a position between these display devices to display an image that complements the images displayed on respective display units. In such manner, the continuity of connection of one image divided into these two displays, that is, the seamless feeling may be provided.

In a configuration where a plurality of display devices are arranged side by side and used as one display device, a non-display area is caused between the plurality of display devices due to structural restrictions. If a character or a pattern is cut/split into two, i.e., is divided by a non-display area caused/therebetween, the character or the symbol may not be understood at a glance. Therefore, time to stare at the screen of the display device may extend, and more time may be required, for imagining/guessing the character or the symbol drawn on the screen. When a driver drives a vehicle, such a situation would be un-desired and dangerous because the time spent looking aside diverts driver's attention away from driving.

According to an example of the present disclosure, a vehicle display system is configured to display a unitary image content on display screens of a plurality of display devices arranged side by side with a non-display area therebetween. The vehicle display system comprises a setting unit configured to, when the image content is to be displayed across the display screens of the plurality of display devices with the non-display area therebetween, set a display area including a duplicated area in which the image content is partially duplicated and to be displayed on the display screens of the plurality of display devices. The vehicle display system further comprises a determination unit configured to determine whether the image content includes a specific content represented by character/symbol information or image-recognized character/symbol information. The vehicle display system further comprises a duplicated display processing unit configured to, on determination of the determination unit that the image content includes the specific content, set a duplication width of the duplicated area based on a width of the specific content and display the image content of the duplicated area on the display screens of the plurality of display devices.

In such manner, the image content of the duplicated area corresponding to the duplication width can be displayed on the display screens of the plurality of display devices, thereby allowing the vehicle occupant to understand the specific content that is duplicated and displayed at a glance, and appropriately providing information to the vehicle occupant.

Several embodiments of a vehicle display system 1 will be described in the following with reference to the drawings. In the following description, the same reference numerals are given to substantially same portions according to the embodiments.

First Embodiment

Figure 1B:
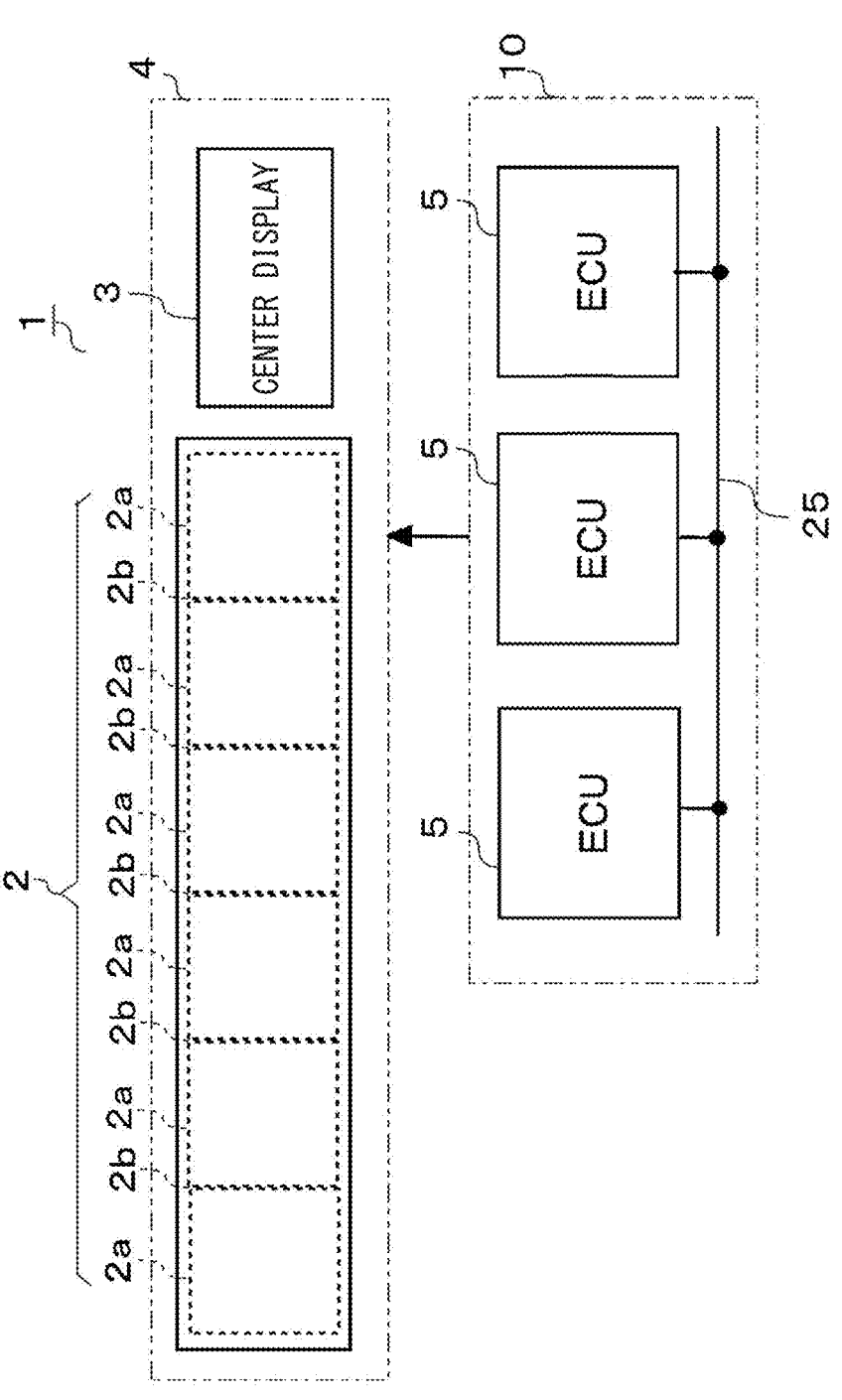
FIG. 1B is part 1 of a diagram of a configuration and a control image of a PtoP display.

The first embodiment will be described with reference to FIGS. 1A to 10. As shown in FIGS. 1A and 1B, the vehicle display system 1 includes a cockpit system 4 including a plurality of display devices such as a pillar-to-pillar display 2, a center display 3 and the like. It is noted that, the number of display devices, the installation situation, and the configuration are only examples, and the present disclosure is not limited to the above. Hereinafter, the pillar-to-pillar display 2 is also referred to as a PtoP display 2.

As shown in FIGS. 1A and 1B, the PtoP display 2 is configured such that a plurality of displays 2a are arranged side by side and to have a horizontally large length. Each of displays 2a of the PtoP display 2 is composed of a liquid crystal display, an organic EL display, or the like, and is a large display provided on a dashboard between a left pillar and a right pillar of the vehicle. The PtoP display 2 is configured to be able to display various image contents R such as meter images, images captured by a peripheral camera 23, entertainment images such as still images and moving images, map images around the current position in full graphic display.

The center display 3 is composed of, for example, a liquid crystal display or an organic EL display, and is installed at a position between a driver's seat and a passenger's seat and below the PtoP display 2, as shown in FIG. 1A. The center display 3 is provided at the proximity of a center console so that both of the driver and the vehicle occupant in a navigator seat can easily view it, and can display various contents. An operation panel 21 is provided above the center display 3, and it is possible to perform input operations such as selecting contents to be displayed on the PtoP display 2, operating air conditioning, operating audio devices, and operating navigation functions.

The PtoP display 2 is installed side by side with the center display 3 in the vertical direction. When two screens are installed side by side in the vertical direction, it is possible to increase the area that the vehicle occupant can recognize at once. Further, in the cockpit system 4, the display screen of each of the displays 2a of the PtoP display 2 is installed so as to be positioned further away from the driver/navigator than the display screen of the center display 3. Each of the displays 2a of the PtoP display 2 has a black belt-like frame 2b as its outer frame. Since the frame 2b is provided to surround the display screen, it forms a non-display area Rz (see FIG. 6, and the like).

Figure 2:
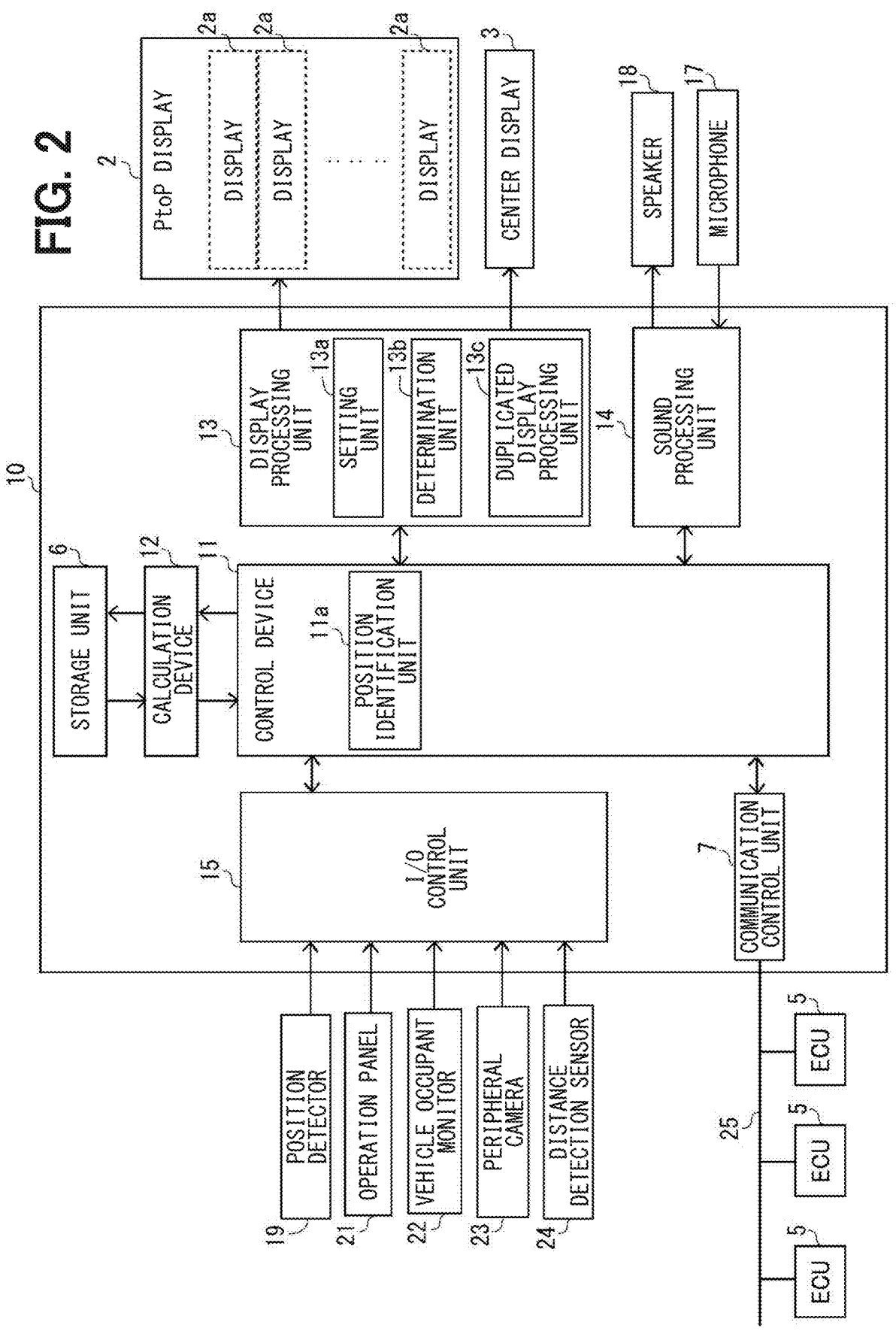
FIG. 2 is a block diagram schematically showing a vehicle display system.

Further, as shown in FIGS. 1B and 2, a large number of ECUs 5 are configured in the vehicle, and are connected to an in-vehicle network 25. The ECUs 5 include a display system ECU, a periphery monitoring system ECU, a travel control system ECU, and a DCM that communicates with an outside of the vehicle. The DCM is an abbreviation for data communication module. The travel control system ECU includes a well-known vehicle control ECU, an engine control ECU, a motor control ECU, a brake control ECU, a steering control ECU, an integrated control ECU, and the like. The travel control system ECU includes an automated driving ECU. The automated driving ECU may also be an autonomous driving electric control unit.

When an automatic control signal is input, the automated driving ECU drives a driving actuator to execute a corresponding, predetermined level of driving assistance and automatic driving. For example, in the driving support of level 1, an automatic braking operation to avoid collisions with obstacles, a follow-up driving operation that follows the preceding vehicle, or a lane-departure prevention driving operation that controls the vehicle so that it does not stray across lane boundaries on both sides is performable. In the automated driving of level II, the following is performable, e.g., a combination of the driving supports of level 1, or an automatic driving mode, which is an automatic driving in a specific condition, such as an automatic overtaking of a slow vehicle in an expressway, a merging to and an exiting from the expressway and the like. Here, in the automated driving of level II, the driver has an obligation of monitoring the automated driving. In the automated driving of level III and above, the system performs all driving tasks while monitoring the system by itself.

Each of the ECUs 5 includes, as primary components, a microcomputer having a processor, a cache memory, various storage units 6 such as a RAM, and a ROM, an I/O, and a bus connecting the above. Each of the ECUs 5 is communicably connected to other ECUs 5 provided in the vehicle through a communication control unit 7 and the in-vehicle network 25.

Figure 1C:
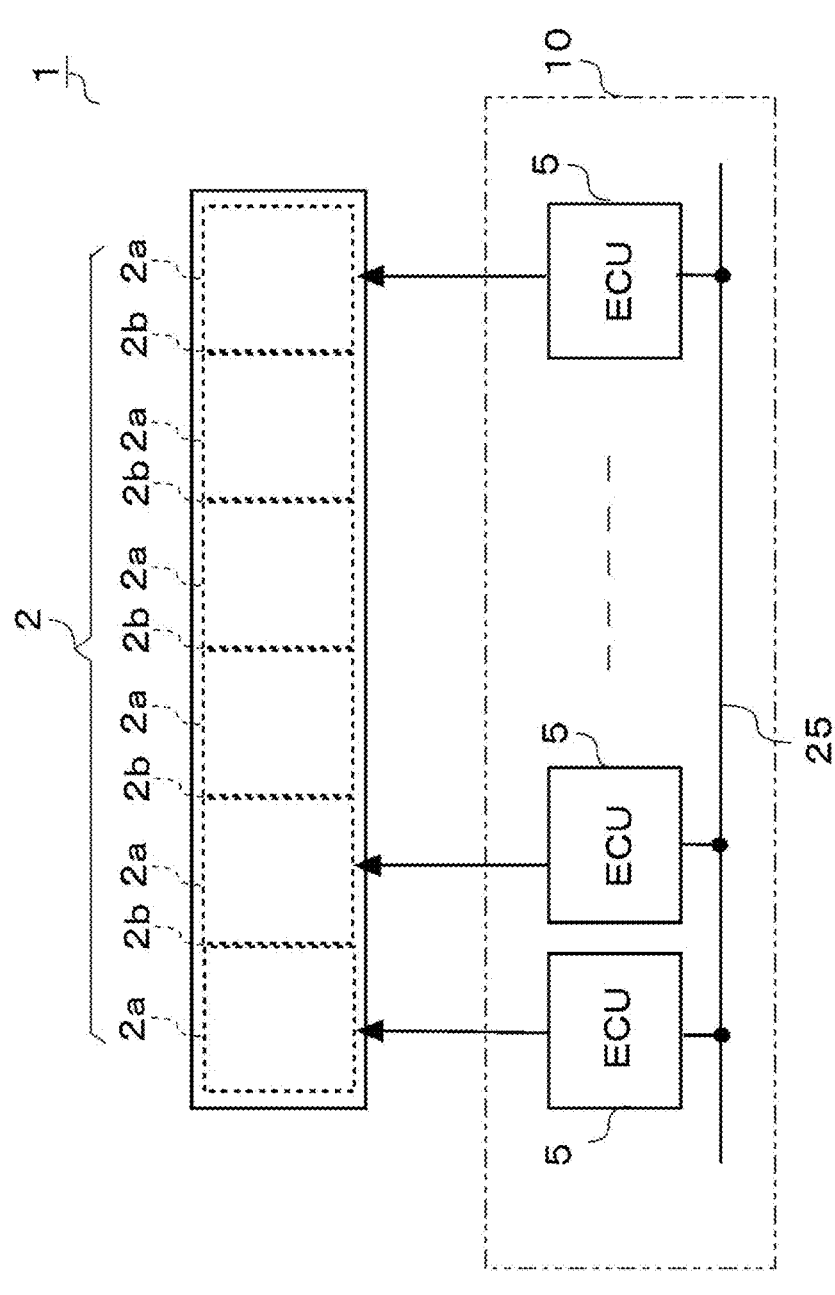
FIG. 1C is part 2 of a diagram of the configuration and the control image of the PtoP display.

In the present embodiment, as shown in FIGS. 1A to 1C, a plurality of display system ECUs 5 constitute an HCU serving as an information processing device 10. The display system ECUs 5 shares the processing capacity of its internal physical resources, and performs display processing for an image display on the displays 2, 3, and the like, in which, for example, as shown in FIG. 1C, display processing is performed separately by an ECU 5 for a display 2a. The HCU is an abbreviation for human machine interface control unit. Although showing a configuration in which the display system ECUs 5 are also connected to the in-vehicle network 25, the ECUs 5 may be connected by a dedicated line. The storage unit 6 described above is a non-transitory, tangible storage medium for non-transitory storage of computer readable programs and data. The non-transitory, tangible storage medium may be implemented by a semiconductor memory or the like.

As shown in FIG. 2, the information processing device 10 includes a control device 11, a calculation device 12, the storage unit 6, a display processing unit 13, a sound processing unit 14, an I/O control unit 15 for managing input to or output from various devices, the communication control unit 7 for managing communication with other ECUs 5, and a wireless control unit 16 configured by connecting an antenna 16a to enable wireless connection with other mobile terminals 27 by wireless LAN or Bluetooth (registered trademark). Here, a configuration is described in which output signals of primary components such as a position detector 19, a vehicle interior camera 20, the operation panel 21, an vehicle occupant monitor 22, the peripheral camera 23, and a distance detection sensor 24 shown in FIG. 2 are provided as signals that are input to the information processing device 10 through the I/O control unit 15, signals may also be input from other ECUs 5 such as the periphery monitoring system ECU, the travel control system ECU and the like through the in-vehicle network 25.

The wireless control unit 16 establishes a communication link with the mobile terminal 27 carried by a vehicle occupant. The information processing device 10 waits for an incoming call to the mobile terminal 27, and when the mobile terminal 27 receives an incoming call from the other party and answer the incoming call, the information processing device 10 performs a hands-free call with the other party through a speaker 18 and a microphone 17 via the mobile terminal 27. Further, the information processing device 10 can perform voice recognition on a voice input through the microphone 17.

Under the control of the control device 11, regarding the contents of images, sentences, characters, or symbols (here-inafter referred to as images, or the like) stored in the storage unit 6, the calculation device 12 (A) calculates the display areas of the display screens on the displays 2 and 3, (B) calculates (i) which one of the display areas of the display screens on the displays 2 and 3 to use for the display of the contents of the images, and the like, or (ii) which of the display areas of the display screens on the displays 2 and 3 to use for the duplicated display of the contents of the images, and the like, and (C) outputs the contents of the images, and the like to the control device 11. Herein, the symbol is a general term for not only the original meaning of the symbol, but also the contents such as traffic signs that are represented by icons, and more specifically indicates information to be displayed on the displays 2 and 3 other than image, sentence, text or the like.

The display processing unit 13 displays contents such as images, and the like on the display screens of the displays 2 and 3 under the control of the control device 11. On the display screens of the displays 2 and 3, contents such as images, and the like can be superimposed and displayed for each of display layers.

Under the control of the control device 11, the sound processing unit 14 receives a reception voice input from the microphone 17, and outputs a transmission voice from the speaker 18. When contents such as a sentence and/or a character are input from the control device 11, the sound processing unit 14 converts them into voice, reads them out loud through the speaker 18 for the output.

The position detector 19 detects a position with high accuracy using a well-known GNSS receiver such as GPS (not shown) and an inertial sensor such as an acceleration sensor, a gyro sensor or the like. The position detector 19 outputs a position detection signal to the control device 11 through the I/O control unit 15. A position identification unit 11a of the control device 11 realizes a function as an ADAS locator that sequentially measures a current position of the vehicle with high accuracy based on map information input from a map data input device and the position detection signal of the position detector 19. ADAS is an abbreviation for advanced driver assistance systems.

The map data input device is composed of a non-volatile memory or the like, and stores map data including various data such as link data, node data and the like. The link data includes link identification data that identifies links that form roads on the map, link length data that indicates a length of the links, link orientation data that indicates an orientation of the links, link traveling time data that indicates time required for traveling the link, node coordinate data that indicates the coordinates of nodes forming a start and end points of the link, link attribute data that indicates attributes of road, and the like. The link attribute data includes the character/symbol information, indicating, (a) prefecture names and city names M1, road symbols M2 by icons including information on national roads and prefectural roads, and town names M4.

The node data includes various types of data, such as (a) node identification data that identifies a node existing on the map, (b) node coordinate data that indicates the coordinates of the node, (c) node name data that indicates a name of the node, (d) node type data that indicates a type of the node such as an intersection, or the like, connecting link data that identifies a link connected to the node. Further, the map data described above is also associated with character/symbol information in which facility names M3 such as a park and the like is described with identification information such as a character code or the like. The display processing unit 13 can generate the image content R of a map of an arbitrary location based on these map data, and can also generate the image content R that includes a part or all of the aforementioned character/symbol information. Note that the size, vertical width, and horizontal width when the display processing unit 13 displays the character/symbol information is determined as follows: town names M4<facility names M3<road symbols M2<city names M1.

A vehicle position obtained by navigation processing is represented in a coordinate system consisting of latitude and longitude, and in such coordinate system, for example, the X axis indicates longitude and the Y axis indicates latitude. It should be noted that the measurement of the vehicle position may be performed in various manners, such as, for example, a method based on travel distance information obtained from a sensing result by a vehicle speed sensor mounted on a subject vehicle, as long as a position of the subject vehicle is identifiable.

The operation panel 21 is a touch panel configured on a predetermined display, e.g., on the center display 3, and the I/O control unit 15 receives an operation input from the passenger, and outputs the operation input to the control device 11. The control device 11 executes control based on operation signals from the operation panel 21. For example, when a vehicle occupant inputs a destination to the operation panel 21 while a navigation application, which will be described later, is being executed, the control device 11 causes the display processing unit 13 to display a map screen while executing navigation processing that provides guidance for the user from the current position of the subject vehicle to the destination.

At this time, the vehicle occupant can, for example, operate the operation panel 21 while the vehicle is stopped to give an instruction to move display areas R1 and R2 (see FIG. 6) of the map, or to give an instruction to change the scale. Upon receiving an instruction through the control device 11, the display processing unit 13 moves the display areas R1 and R2 in the image content R, and/or enlarges or reduces the size of the display areas R1 and R2 to change the scale of the map. In such manner, a map can be set to display an arbitrary area such as a proximity of the current position where the subject vehicle is present or a proximity of the destination, and the scale of the map display can also be changed.

The vehicle occupant monitor 22 detects the state of the vehicle occupant in the vehicle or the operation state thereof. The passenger monitor 22 is configured using, for example, a power switch, a vehicle occupant state monitor, a turn switch, an automatic control switch, and the like, and outputs various signals to the control device 11. Further, the vehicle occupant monitor 22 may include a steering sensor that detects whether the steering wheel is being gripped or steered by the driver, a seating sensor that detects whether the driver is seated, an accelerator pedal or brake pedal depression sensor, and the like.

The power switch is turned on by a user in the vehicle compartment in order to start an internal combustion engine or an electric motor, and outputs a signal corresponding to the operation. The vehicle occupant state monitor includes a camera that detects the state of the vehicle occupant in the driver's (D) seat or the passenger's (P) seat by photographing the state of the vehicle occupant with an image sensor, and outputs an image signal. The vehicle occupant state monitor regarding a driver is designated as DSM. The DSM is an abbreviation for a Driver Status Monitor. The vehicle occupant state monitor obtains an image signal obtained by irradiating a head/face of the driver with near-infrared light and capturing an image, analyzes the image as necessary, and outputs the signal to the control device 11. The vehicle occupant state monitor is used to detect the state of an vehicle occupant such as a driver, especially during driving assistance or automatic driving. The turn switch is turned on by an vehicle occupant inside the vehicle to activate a blinker of the vehicle, and outputs a turn signal for turning right or left according to the operation.

The automatic control switch outputs an automatic control signal in response to the vehicle occupant operation when the vehicle occupant in the vehicle compartment executes an on operation in order to instruct an automatic control of the driving state of the vehicle. Based on the signal from the vehicle occupant monitor 22, the control device 11 can determine a behavior of the vehicle occupant, e.g., which direction the line of vehicle occupant sight is directed, and can also have an input thereto regarding the operating state of the power switch, the operating state of the blinker, and the instruction information of the automatic control of the vehicle.

The peripheral camera 23 including a front camera that images a front field of the vehicle, a back camera that images a rear field of the vehicle, a corner camera that images a front and rear sides of the vehicle, or a side camera that images a side of the vehicle, an electronic mirror and the like serves as a periphery monitoring sensor, respectively outputting image signals to the control device 11 through the I/O control unit 15 as a front guide monitor, a back guide monitor, a corner view monitor, a side guide monitor, and the electronic mirror, and the image signals are stored in the storage unit 6. The communication control unit 7 is connected to thein-vehicle network 25 such as CAN, LIN, or the like, and performs communication control of data exchange with other ECUs 5.

Further, the distance detection sensor 24 for detecting a distance to an obstacle is installed in the vehicle as a periphery monitoring sensor. The distance detection sensor 24 includes a clearance sonar, a LiDAR, a millimeter wave radar, and the like, and detects vehicles, people, animals, fallen objects on the road, guardrails, curbs, trees, and the like approaching toward the front of the vehicle, the front side part of the vehicle, the rear side part of the vehicle, the rear of the vehicle, or the side part of the vehicle. The distance detection sensor 24 can also detect an azimuth to the obstacle and the distance to the obstacle. Further, with the above-mentioned periphery monitoring sensor, it is possible to detect road markings, such as traffic lane lines, stop lines, and pedestrian crossings painted on the road around the subject vehicle, traffic signs such as a "stop" sign painted on the road, a stop line painted at a boundary of an intersection, and the like.

Figure 3:
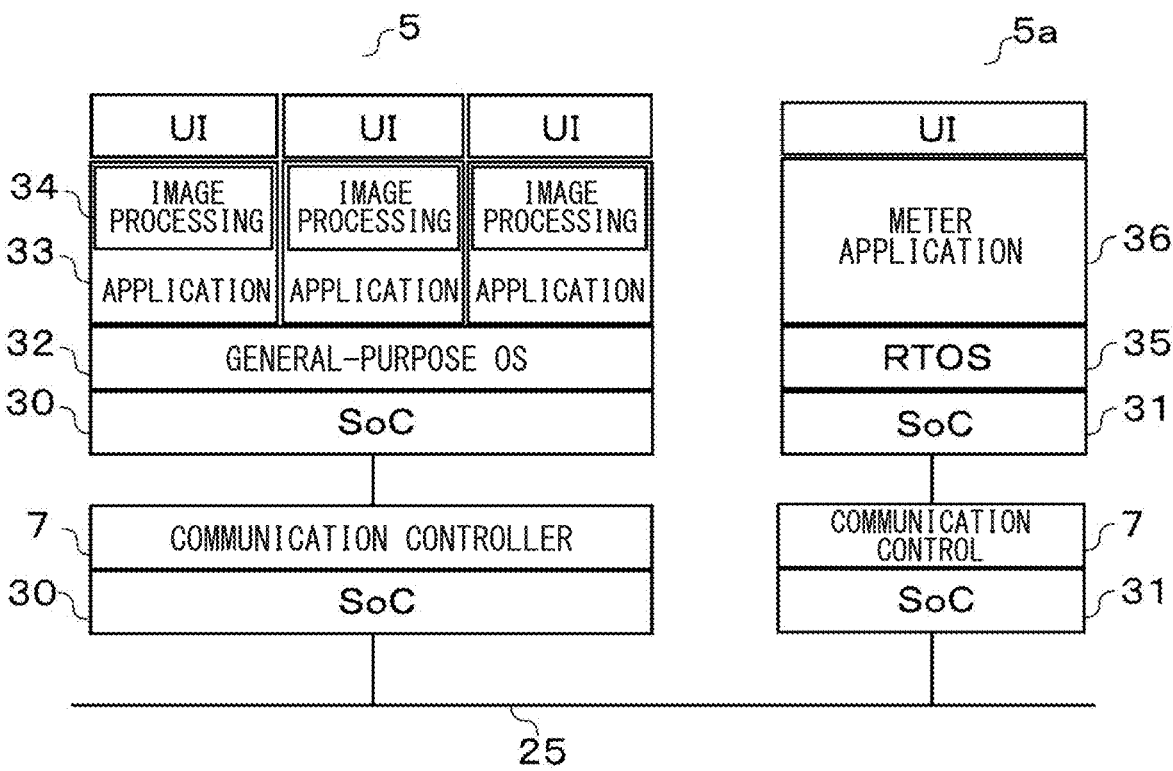
FIG. 3 is a diagram schematically showing a configuration of hardware and software.

FIG. 3 shows an example of a hardware and software configuration of the information processing device 10. SoCs 30 and 31 are mounted on ECUs 5 and 5a, respectively, and the above-described microcomputers are built into the mounted SoCs 30 and 31, respectively. The built-in microcomputers in the SoCs 30 and 31 of the ECUs 5 are configured to execute various applications 33 (hereinafter abbreviated as apps 33) on a pre-installed, general-purpose OS 32, such as LinuxOS (Linux is a registered trademark). The SoC is an abbreviation for System On Chip.

The application 33 includes an image processing application 34, a navigation application, and other applications. A processor built into the SoC 30 performs a drawing process in response to a drawing request from the image processing application 34, to draw an image on the display screen of each display 2a of the PtoP display 2.

On the other hand, since the ECU 5a is provided for drawing a meter, a symbol 5a is given. On the microcomputer built into the SoC 31 of the ECU 5a, a real-time OS 35 capable of processing with higher real-time performance than the general-purpose OS 32 is installed, and a meter application 36 is operated on the real-time OS 35. Note that the following description may focus on the applications 33 such as the image processing application 34 and the meter application 36.

The meter application 36 notifies the user of a vehicle speed, the number of revolutions, warnings, and the like, and draws the image content R of a meter in a specific display area of the PtoP display 2. For example, the meter application 36 draws an image content R such as a speedometer, a tachometer, a shift range position state, a warning light and the like. The speedometer includes a speed image whose display needs to be updated in real time to show changes in the speed of the vehicle. Similarly, the tachometer is also included in the meter image because the display needs to be updated in real time to show changes in the number of revolution.

A content to be drawn by the meter application 36 can also be displayed on other displays, such as the center display 3, for example. The content to be drawn by the meter application 36 is required to have relatively high real-timeness than the content drawn by other applications.

The application 33 includes a navigation application. The navigation application implements the navigation function described above, and draws the image content R such as a navigation screen including a map and a current position of the vehicle, and the like mainly on the PtoP display 2 or the center display 3.

Also, the application 33 includes an image synthesizing application. The image synthesizing application identifies the sizes and types of various image contents R to be displayed on the display device, synthesizes a part of the image contents R in one frame, and outputs this synthesized mixed image to the PtoP display 2 or the center display 3. The image synthesizing application implements a function as an image synthesizing unit, which may also be called as a compositor, and a function as an image output unit.

Display layers for drawing the image content R are assigned to the application that draws the image content R among the applications 33 and 36. These display layers are reserved on the storage unit 6 in a size capable of drawing the required image content R.

Also, the image content R displayed on the PtoP display 2 and the center display 3 can be displayed as animated. Here, the animation operation is a display mode in which a position and a size of an image indicating the content gradually change, the rotation of the image, a move of a user interface as a whole along with a swipe operation, fade-in or fade-out of the image, a color change of the image, and the like.

The control device 11 executes various processes by executing the application 33. Further, the display processing unit 13 also implements functions as the setting unit 13a, the determination unit 13b, and the duplicated display processing unit 13c of the present application by executing various applications 33.

The action and operation of the above configuration will be described with reference to FIG. 4 and subsequent drawings. The information processing device 10 causes the display processing unit 13 to display various contents on the PtoP display 2 and the center display 3, which may be (a) a display processing for a display of a single content on the display screen of one of the displays 2a in the PtoP display 2, or (b) a display processing for a display of a single content on the second display screen of the center display 3, or (c) a display processing for a display of a unitary image content R extending across the display screens of the multiple displays 2a of the PtoP display 2 arranged side by side and adjacent to each other in the lateral direction.

When the information processing device 10 displays the unitary image content R over the display screens of the adjacent, multiple displays 2a, the visibility is degraded due to the frames 2b existing in between the display screens of the multiple displays 2a. Refer to the non-display area Rz shown in FIG. 6. At this time, continuous images or sentences cannot be displayed across the multiple displays 2a, resulting in discontinuous display, and the continuity of display is not maintained. Therefore, the information processing device 10 performs display processing as shown in FIG. 4 so as not to make the vehicle occupant feel incongruity.

A specific example of a case where the information processing device 10 activates the navigation application and displays a large map on the multiple displays 2a will be described in the following. When the power switch is operated by the vehicle occupant, the control device 11 activates the navigation application in S1 of FIG. 4. The control device 11 reads the image content R of the map around the current position from the map data input device, and prepares and sets it in a work area of the storage unit 6 in S2 of FIG. 4.

Figure 5:
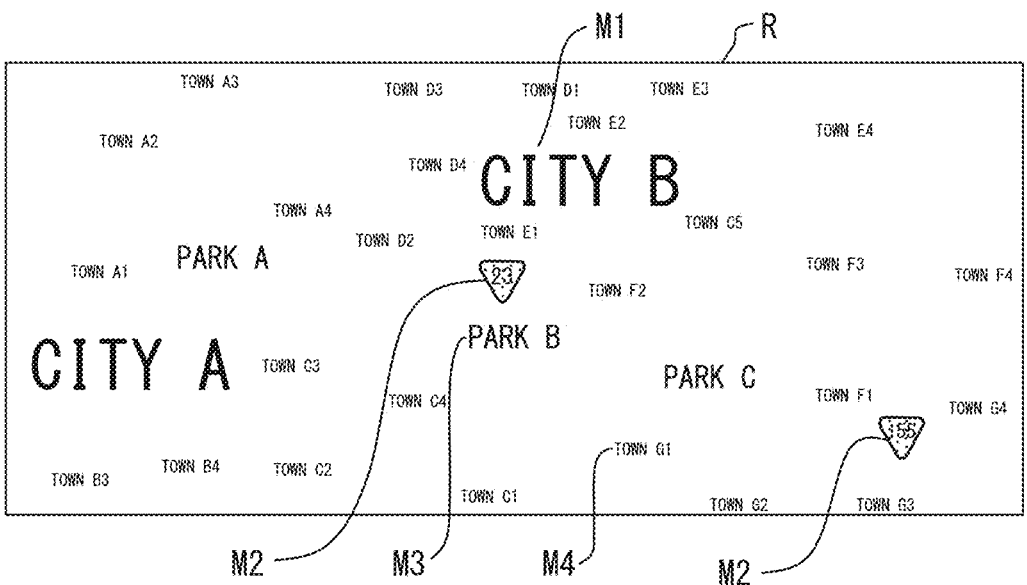
FIG. 5 is an explanatory diagram of an image content.

A case where the image content R shown in FIG. 5 is prepared will be described. As described above, the map data read from the map data input device to the work area of the storage unit 6 contains character/symbol information as character/symbol contents. The character/symbol information includes identification information such as character codes representing prefecture names and city names M1, road symbols M2 of national roads and prefectural roads, facility names M3 such as parks, and the like.

Figure 4:
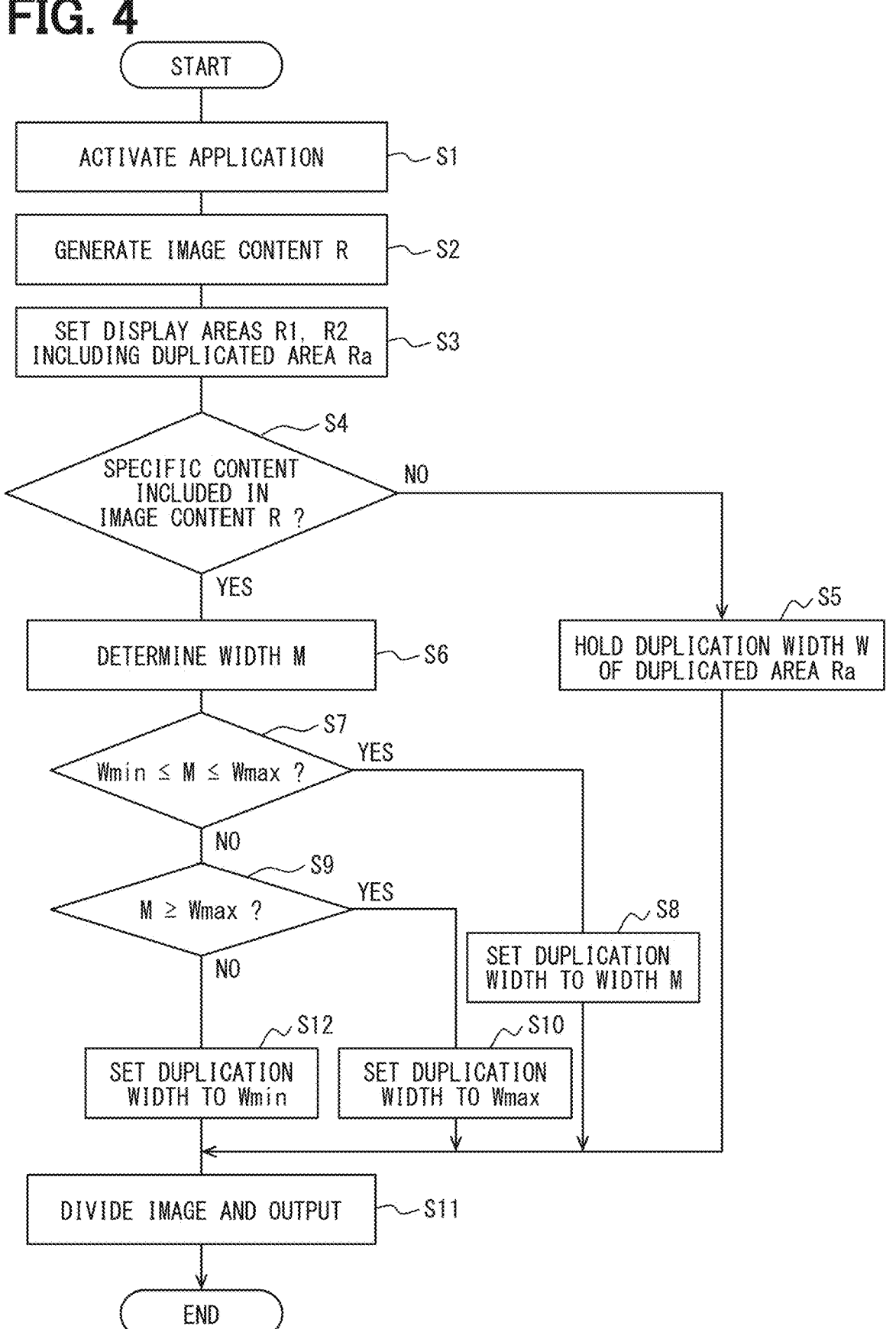
FIG. 4 is a flowchart schematically showing contents of processing.
Figure 6:
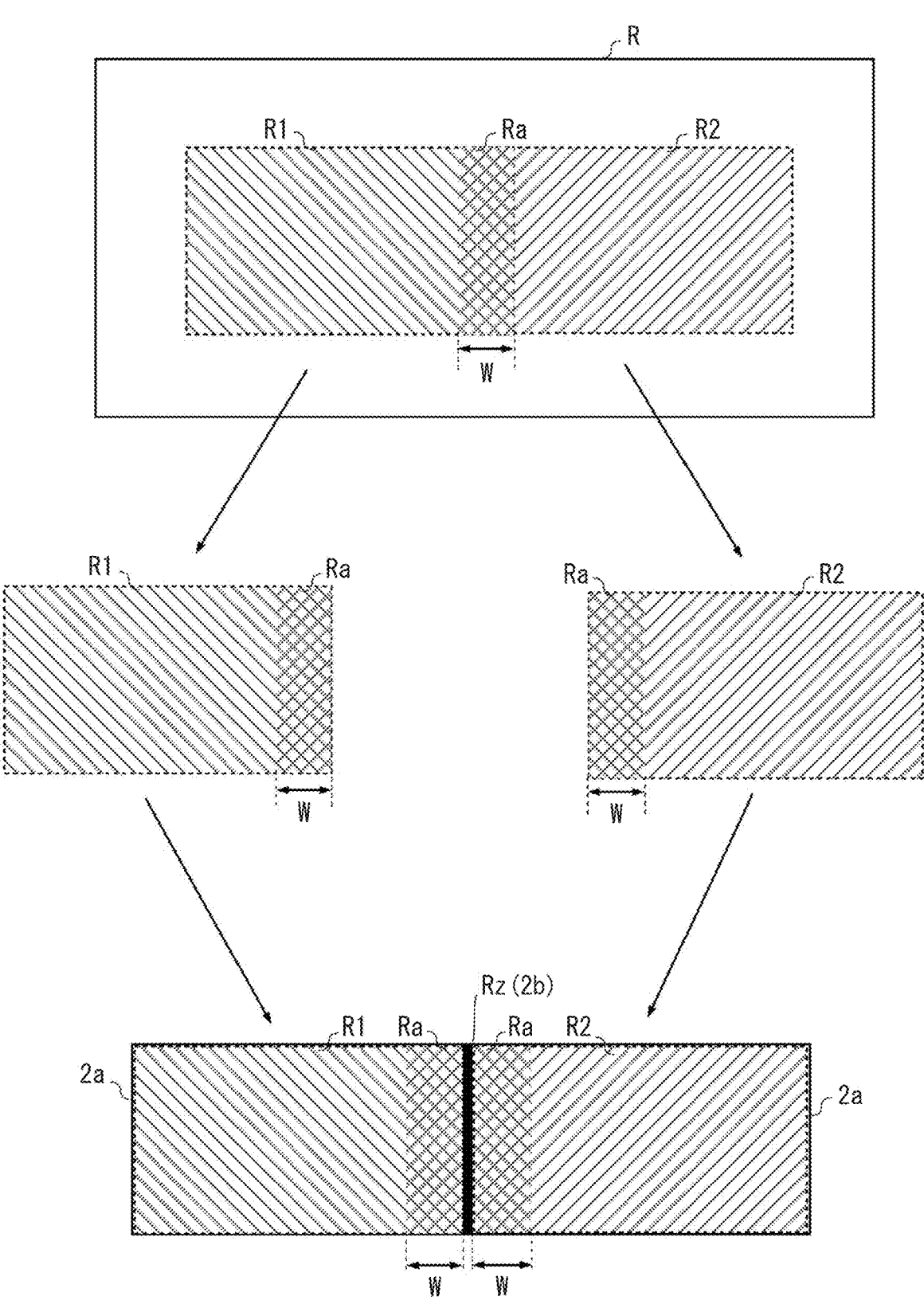
FIG. 6 is an explanatory diagram of a duplication width of display areas displayed on adjacent displays.

The display processing unit 13 generates the image content R including a map and the character/symbol information based on the map data in S2 of FIG. 4. Further, in S3 of FIG. 4, the display processing unit 13 sets the display areas R1 and R2 based on the operation information (for example, display position and scale) input from the operation panel 21 by the vehicle occupant. The display areas R1 and R2 are set so as to partially include a duplicated area Ra where the image content R is partially duplicated, as shown in FIG. 6. The duplicated area Ra indicates an area of the image content R that is partially duplicated and to be displayed on each of the display screens of the adjacent two of the multiple displays 2a. A duplication width W of the duplicated area Ra is set to a predetermined default value in an initial stage.

In S4, the display processing unit 13 determines whether or not the image content R includes character/symbol contents as a specific content using the determination unit 13b. If the image content R does not contain the character/symbol contents, the display processing unit 13 determines NO in S4, and holds the duplication width W of the duplicated area Ra in S5. The default value is held unchanged in this example.

Then, in S11, the display processing unit 13 divides an image into the display areas R1 and R2, such that each of the display areas R1 and R2 includes the duplicated area Ra, and outputs the images of the display areas R1 and R2 to the adjacent multiple displays 2a. Then, the image content R of the duplicated area Ra can be displayed on both of the display screens of the multiple displays 2a. At this time, in particular, the display processing unit 13 displays, on both the displays 2a, the image contents R in the duplicated areas Ra, respectively, to be positioned close to each other in an area including or extending across the non-display area Rz. Therefore, the continuity of the images displayed on the multiple displays 2a can be maintained as much as possible, and the incongruity to be felt by the vehicle occupant is reducible.

On the other hand, when the determination unit 13b determines that the character/symbol contents are included, the display processing unit 13 displays the image content R in the duplicated area Ra on both of the display screens of the adjacent displays 2a, after causing, in S6 to S12, the duplicated display processing unit 13c to set the duplication width W of the duplicated area Ra based on the width of the character/symbol contents.

Specifically, first, when the display processing unit 13 determines in S4 that the character/symbol contents are included in the image content R, the display processing unit 13 determines the width M of the character or symbol in S6, i.e., determines whether the width M is within a predetermined width that is equal to or greater than a lower limit value Wmin and equal to or less than an upper limit value Wmax. The lower limit value Wmin is a predetermined width corresponding to a width of one character for representing the facility name M3. The lower limit value Wmin is set, for example, to a width corresponding to the width of each character of "PARK B" as shown in FIG. 5. The upper limit value Wmax is a predetermined width corresponding to the width of a road symbol M2 such as a national road, and is set to a width corresponding to the horizontal width of an icon representing the national road 23 shown in FIG. 5, for example.

The display processing unit 13 sets the duplication width W of the duplicated area Ra to the width M of the character/symbol contents in S8 on condition that the duplicated display processing unit 13c determines that the width M is within the predetermined width. Then, in S11, the display processing unit 13 outputs, to the adjacent multiple displays 2a, the image contents R of the display areas R1 and R2, which are divided, and each including the duplicated area Ra.

On the other hand, when the duplicated display processing unit 13c determines that the width M is equal to or greater than the upper limit value Wmax of the predetermined width, the display processing unit 13 determines YES in S9, and sets, in S10, the duplication width W of the duplicated area Ra to the upper limit value Wmax, and outputs, in S11, the divided images to the respective displays 2a. Further, when the duplicated display processing unit 13c determines that the width M is equal to or less than the lower limit value Wmin of the predetermined width, the display processing unit 13 determines NO in S9, and sets, in S12, the duplication width W of the duplicated area Ra to the lower limit value Wmin, and outputs, in S11, the divided images to the respective displays 2a. In this way, the duplication width W of the duplicated area Ra can be suppressed to the predetermined width within Wmin≤W≤Wmax, thereby to prevent adjusting the duplication width W without a limitation.

Figure 7:
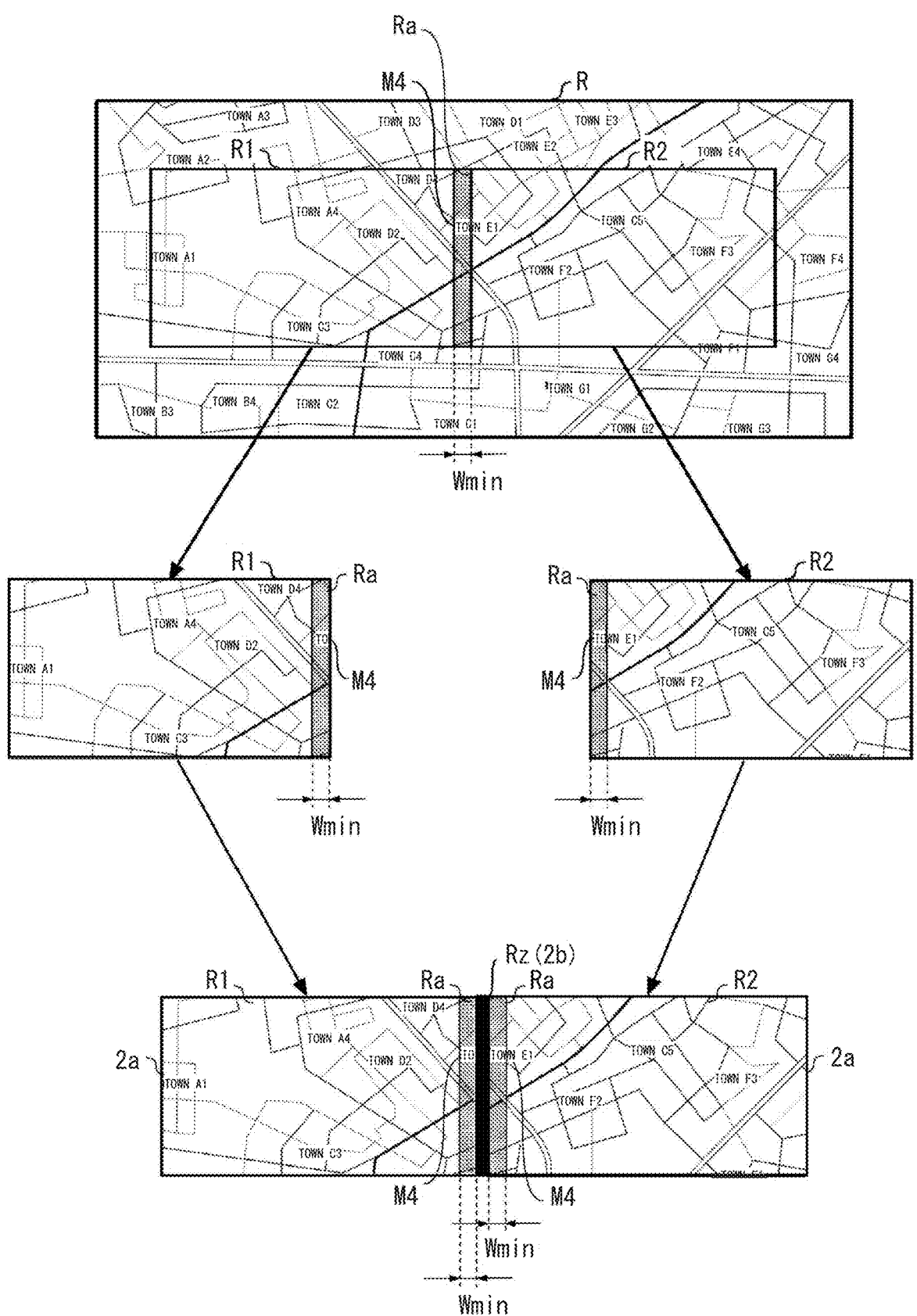
FIG. 7 is part 1 of a diagram of an example of a display mode.
Figure 8:
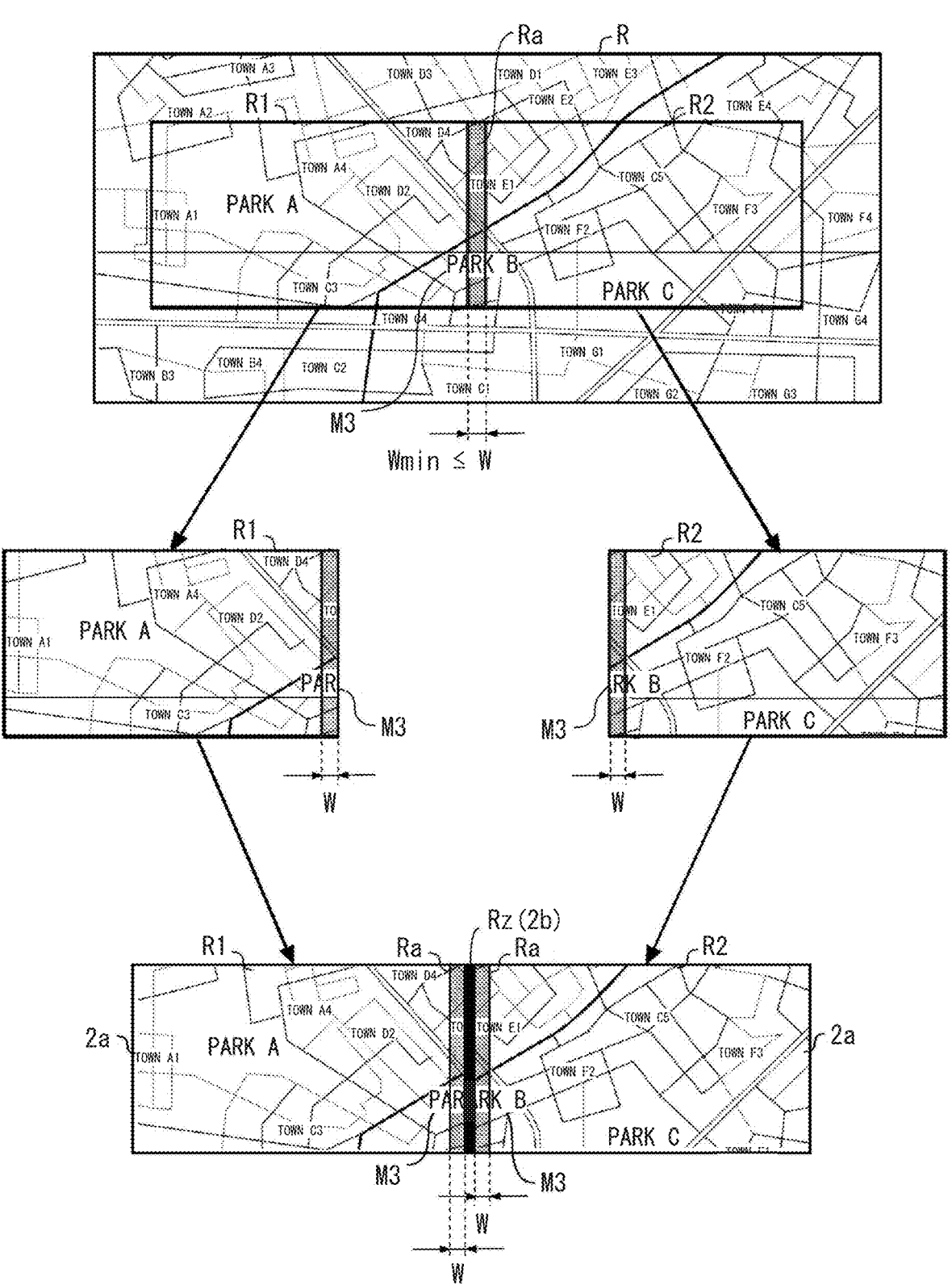
FIG. 8 is part 2 of a diagram of an example of a display mode.
Figure 9:
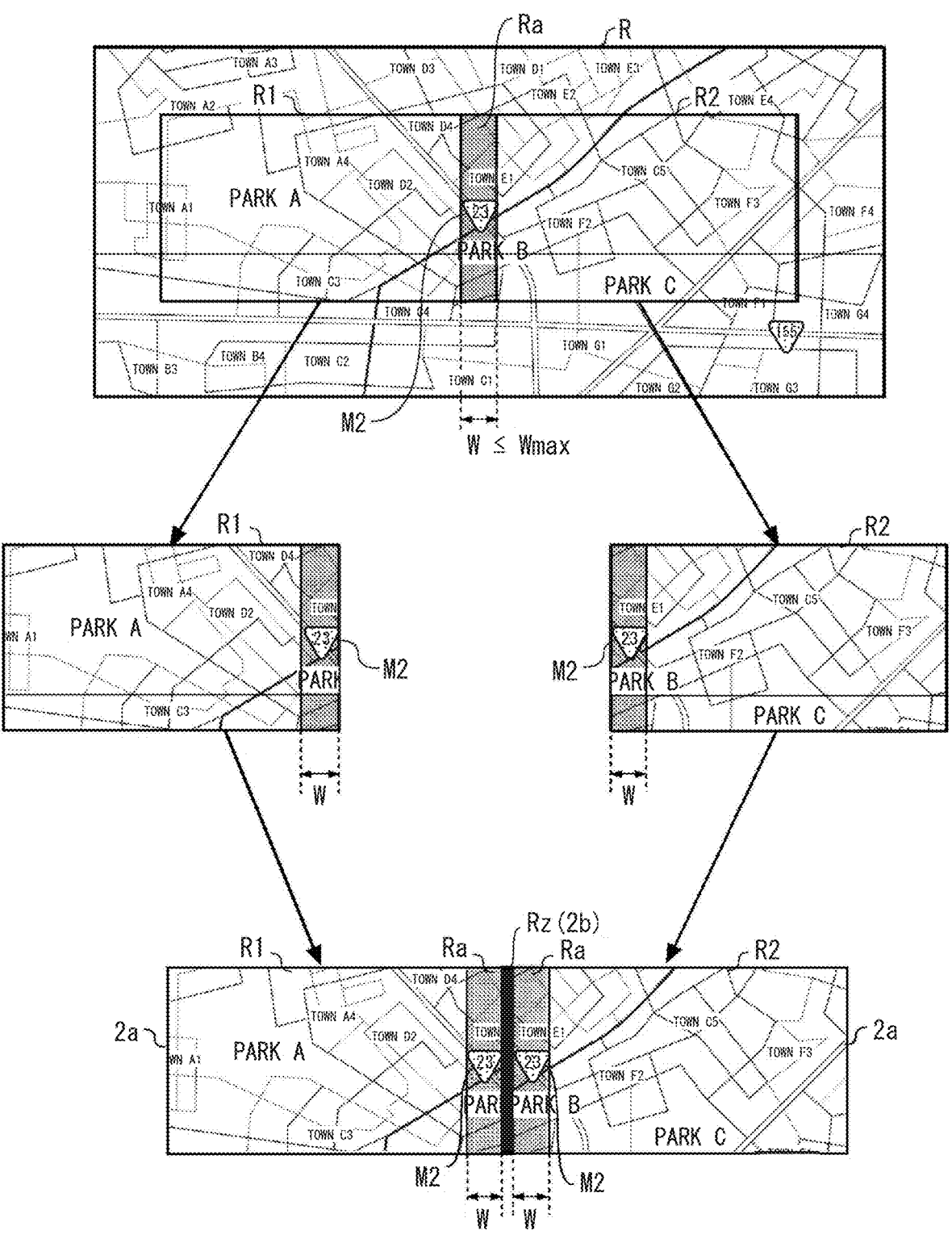
FIG. 9 is part 3 of a diagram of an example of a display mode.
Figure 10:
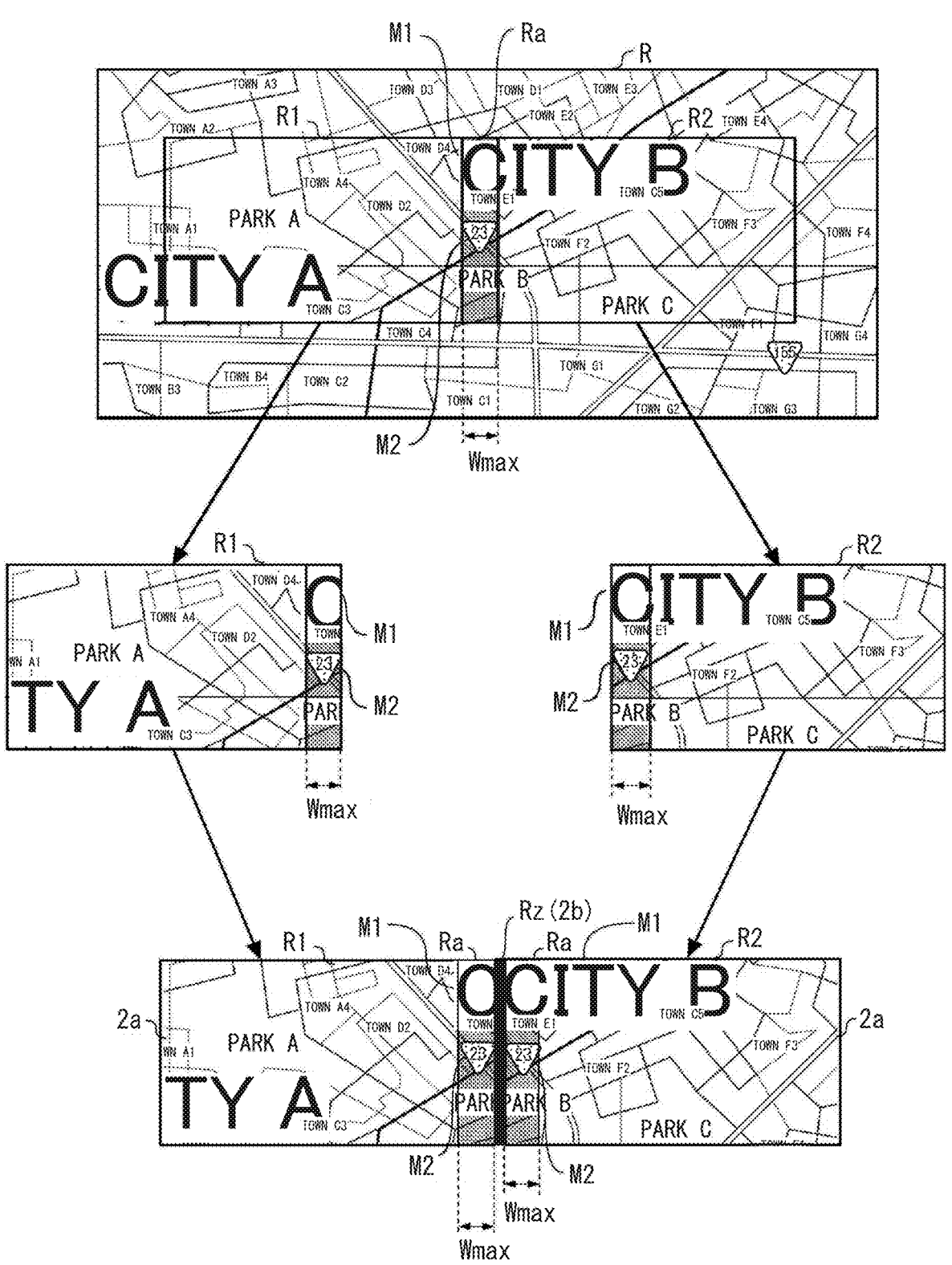
FIG. 10 is part 4 of a diagram of an example of a display mode.

Specific examples are given in FIGS. 7 to 10. FIG. 7 exemplifies a display screen displaying an image content R including, only as the character/symbol information, a town name M4. Further, FIG. 8 exemplifies a display screen displaying an image content R including the town name and a facility name M3. Also, FIG. 9 exemplifies a display screen displaying an image content R including the town name, the facility name, and a road symbol M2. FIG. 10 exemplifies a display screen displaying an image content R including the town name, the facility name, the road symbol M2, and a city name M1.

As described above, the upper limit value Wmax is predetermined corresponding to the width of the road symbol M2, and the lower limit value Wmin is predetermined corresponding to the width of one character of the facility name M3. Therefore, as shown in FIG. 7, when the display processing unit 13 displays a part of the image content R including, only as the character/symbol information, the town name M4 on the respective displays 2a, since the width M of one character of the town name M4 is less than the lower limit value Wmin, the image content R of the display areas R1 and R2 including the duplicated area Ra having the duplication width W set to the lower limit value Wmin is displayed on the respective displays 2a.

Further, as shown in FIG. 8, the display processing unit 13 displays the image content R including the town name and the facility name M3 on the respective displays 2a. In this case, the duplication width W is set to the width of one character of the facility name M3 having the largest width among the characters of the town name M4 and the facility name M3. Further, the image content R of the display areas R1 and R2 each including the duplicated area Ra is displayed on the respective displays 2a. Further, as shown in FIG. 9, the display processing unit 13 displays the image content R including the town name, the facility name, and the road symbol M2 on the respective displays 2a. In this case, the duplication width W is set to the width of the road symbol M2 having the largest width among the characters and the symbol of the town name, the facility name, and the road symbol M2. Further, the image content R of the display areas R1 and R2 including the duplicated area Ra is displayed on the respective displays 2a.

Further, as shown in FIG. 10, the display processing unit 13 displays the image content R including a city name M1 on the respective displays 2a. In this case, the width M of one character of the city name M1 exceeds the upper limit value Wmax. Therefore, the duplication width W is set to the upper limit value Wmax. Further, the image content R of the display areas R1 and R2 including the duplicated area Ra is displayed on the respective displays 2a.

Each of FIGS. 7 to 10 shows an example in which at least a part of the character/symbol contents is included in the duplicated area Ra for the ease of understanding of the contents of the present disclosure. Note that, the character/symbol contents used to set the duplication width W may be various characters and symbols existing in the image content R handled by the vehicle display system 1 in the present disclosure. The display processing unit 13 can change the duplication width W according to the size of the various character/symbol contents present in the image content R.

As described above, according to the present embodiment, the determining unit 13b determines whether or not the image content R includes the character/symbol contents representing the character/symbol information, and when the determining unit 13b determines that the character/symbol contents are included therein, the duplication width W of the duplicated area Ra is set by the duplicated display processing unit 13c based on the width of the character/symbol contents. Further, the image content R of the duplicated area Ra is displayed on both of the display screens of the adjacent displays 2a of the multiple displays 2a. In such manner, the image content R of the duplicated area Ra having the duplication width W can be displayed on both of the display screens of the multiple displays 2a. Therefore, the vehicle occupant can understand the character/symbol contents displayed in a duplicated manner at a glance. Accordingly, information can be appropriately provided to the vehicle occupant.

Further, when the width M of characters and symbols included in the image content R is within a predetermined width, the duplication width W can be changed according to the size of the character/symbol contents, thereby preventing a cut/division of a character/symbol in the middle for the display on the multiple display screens. By preventing the display of the divided character(s) and symbol(s) being cut and divided on the display 2a, the vehicle occupant can understand the characters and symbols one by one at a glance. Moreover, the duplication width W can be changed according to the size of one character or the size of a symbol corresponding to an outer frame encompassing the symbol, for example, thereby preventing uselessly displaying two or more character/symbol contents in a duplicated manner. In such manner, it is possible to reduce the feel of incongruity of the vehicle occupant, and to appropriately provide information to the vehicle occupant.

Further, even when the width M of the character or the symbol included in the image content R exceeds a predetermined width, the duplication width W is set to the upper limit value Wmax or the lower limit value Wmin, thereby preventing adjusting the duplication width W without limitation. In such manner, the sense of incongruity felt by the vehicle occupant is reducible, and information can be appropriately provided to the vehicle occupant.

Moreover, since the image content R of the same duplicated area Ra is drawn on the display screens of the adjacent displays 2a, the image content R of the same color can be drawn on the respective displays 2a. In such manner, it is possible to make the vehicle occupant aware of the image content R included in the duplicated area Ra.

Second Embodiment

Figure 11:
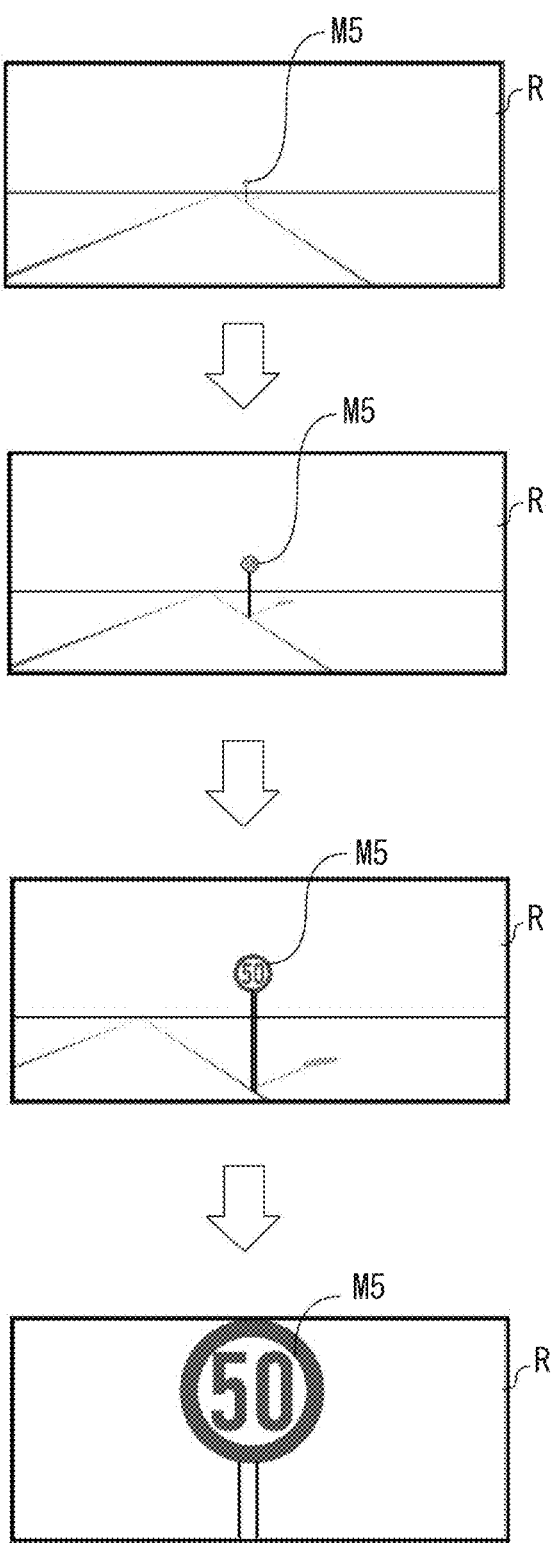
FIG. 11 is part 5 of a diagram of an example of a display mode.

The second embodiment will be described with reference to FIGS. 11 to 16. In the second embodiment, a process for displaying the image content R including a sign M5 captured by the peripheral camera 23 on the adjacent multiple displays 2a will be described. The image content R shown in FIG. 11 is a moving image content in which the sign M5 captured in the image looks like oncoming as time elapses. The contents of the processing are generally the same as those in FIG. 4 and the description thereof described in the above-described embodiment, and the description will be made in the following while referring to the step numbers in FIG. 4.

Figure 12:
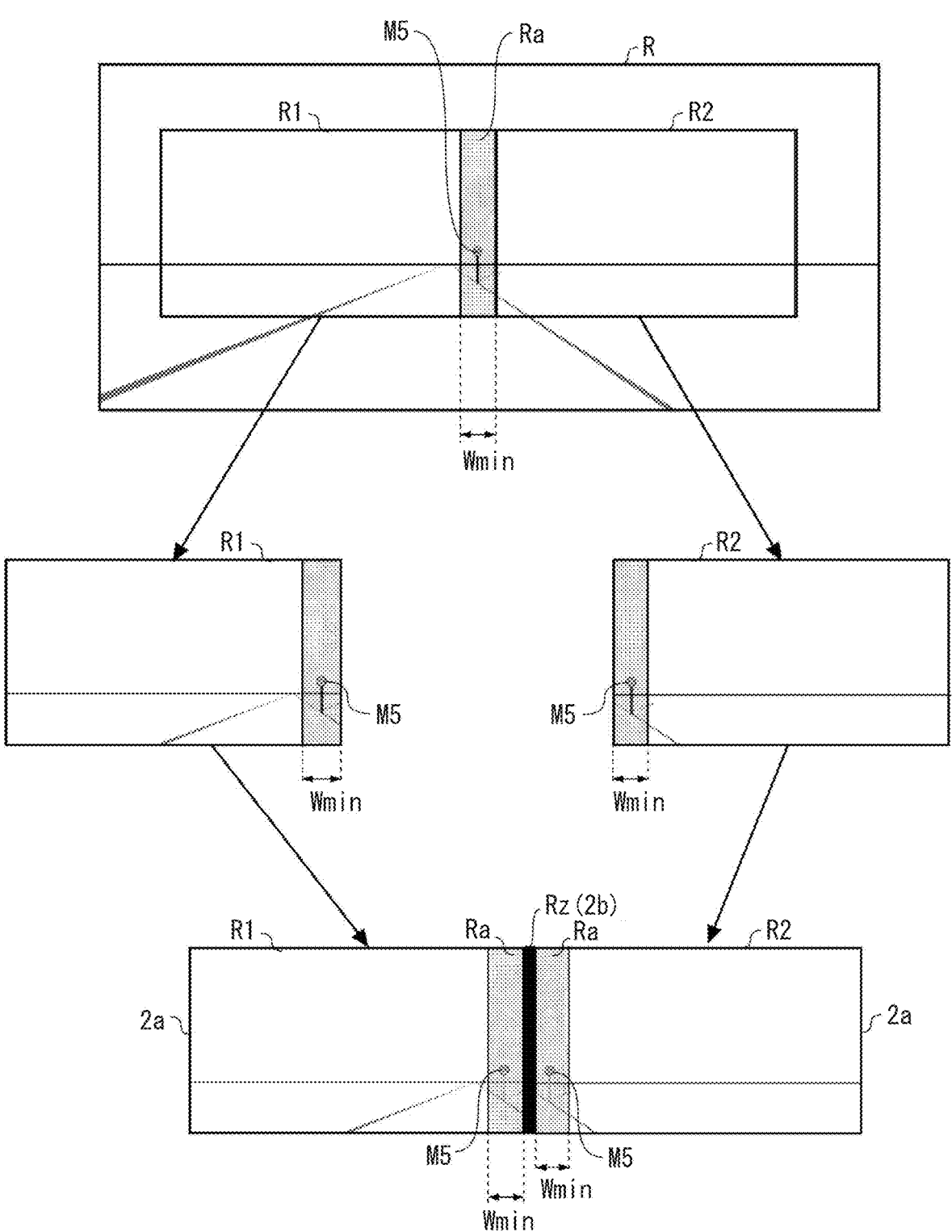
FIG. 12 is part 6 of a diagram of an example of a display mode in a second embodiment.

FIGS. 12 to 15 show the image content R that changes over time and changes in the display screens of the adjacent displays 2a. As shown in FIG. 12, when the distance to the sign M5 is long and the sign M5 appears small in the image content R, the size of the sign M5 in the image content R is also relatively small. Therefore, in S4 of FIG. 4, the display processing unit 13 does not recognize the sign M5, which is the specific content, in the image content R, or determines, in S9, that the recognized sign M5 has a width smaller/narrower than the lower limit width Wmin. Therefore, the display processing unit 13 holds the duplication width W at the default value, or sets it at the lower limit value Wmin, and divides the image, and outputs and displays the divided images on the respective displays 2a. See S1 to S5→S11 or S1 to S4→S6→S7→S9→S12→S11 in FIG. 4.

Figure 13:
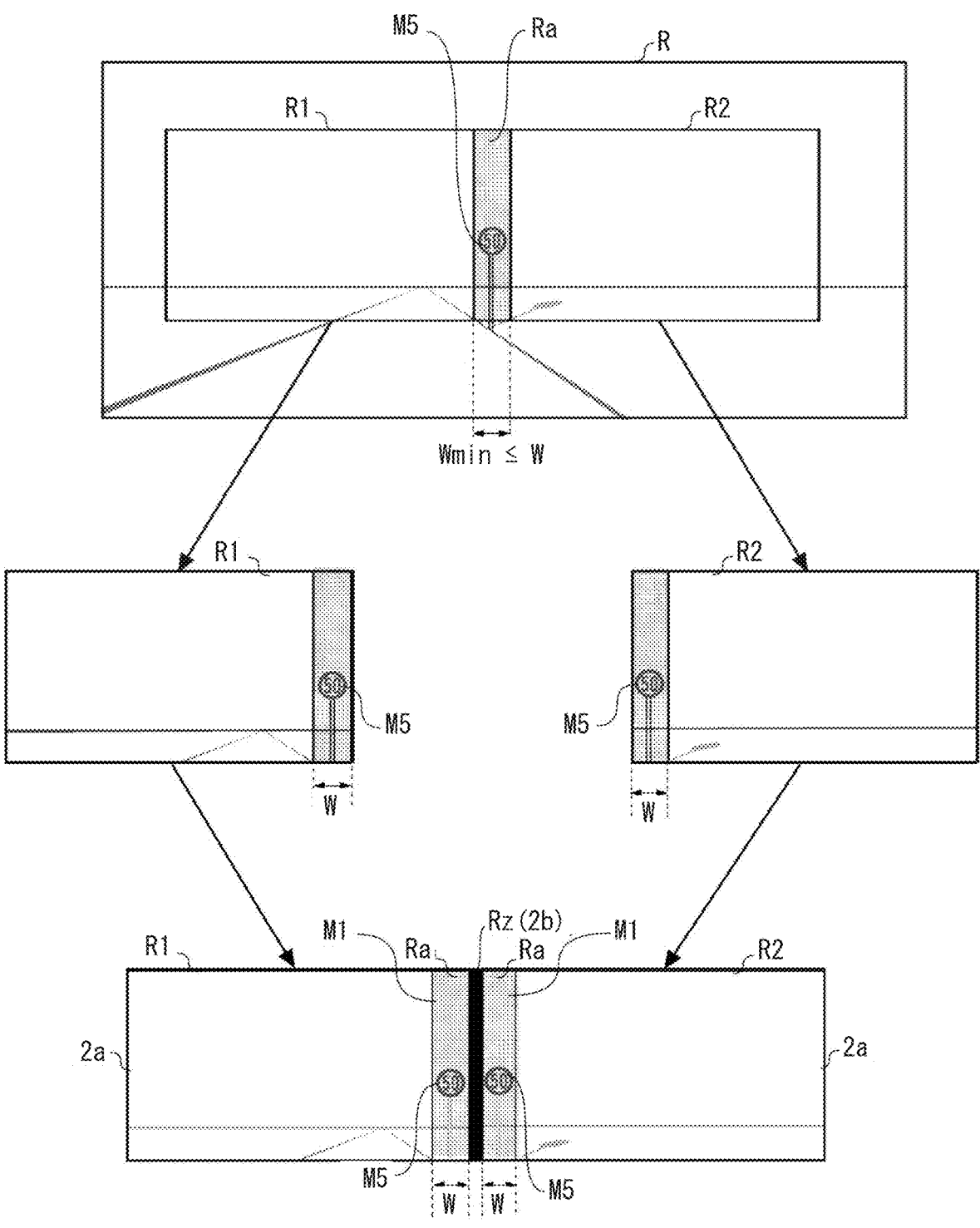
FIG. 13 is part 7 of a diagram of an example of a display mode.
Figure 14:
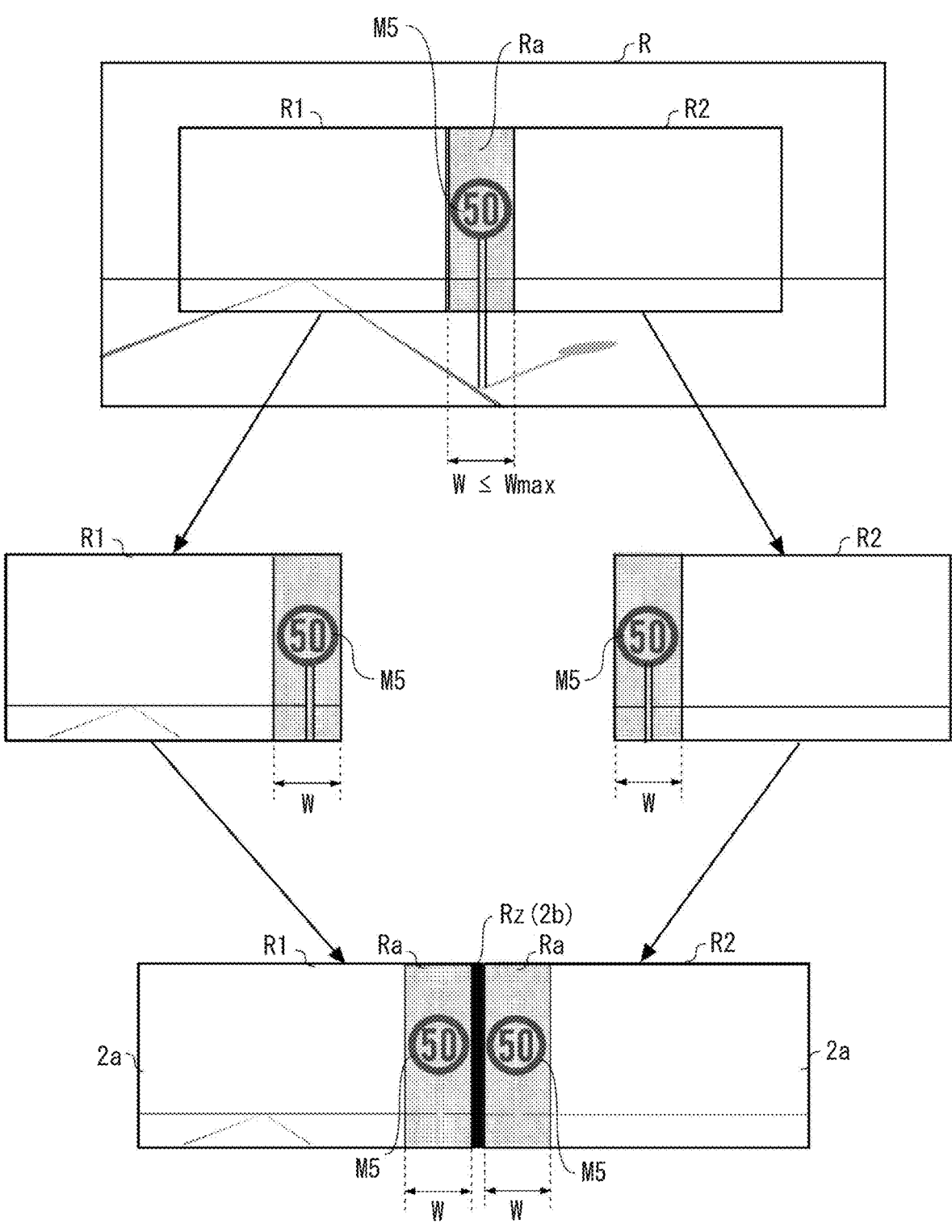
FIG. 14 is part 8 of a diagram of an example of a display mode.

Further, as shown in FIGS. 13 and 14, as the sign M5 gradually approaches, the sign M5 gradually appears larger in the image content R of the captured image. Then, in S4, the display processing unit 13 performs image recognition on the sign M5 to determine that it is the specific content containing the characters or the symbols (equivalent to image-recognized character/symbol information), and sets the duplication width W to the width M of the sign M5, the image is divided and output and displayed on the respective displays 2a. See S1 to S4→S6 to S8→S11 in FIG. 4. At this time, when the size of the sign M5 appearing in the captured image gradually increases, the duplication width W also gradually increases accordingly.

Figure 15:
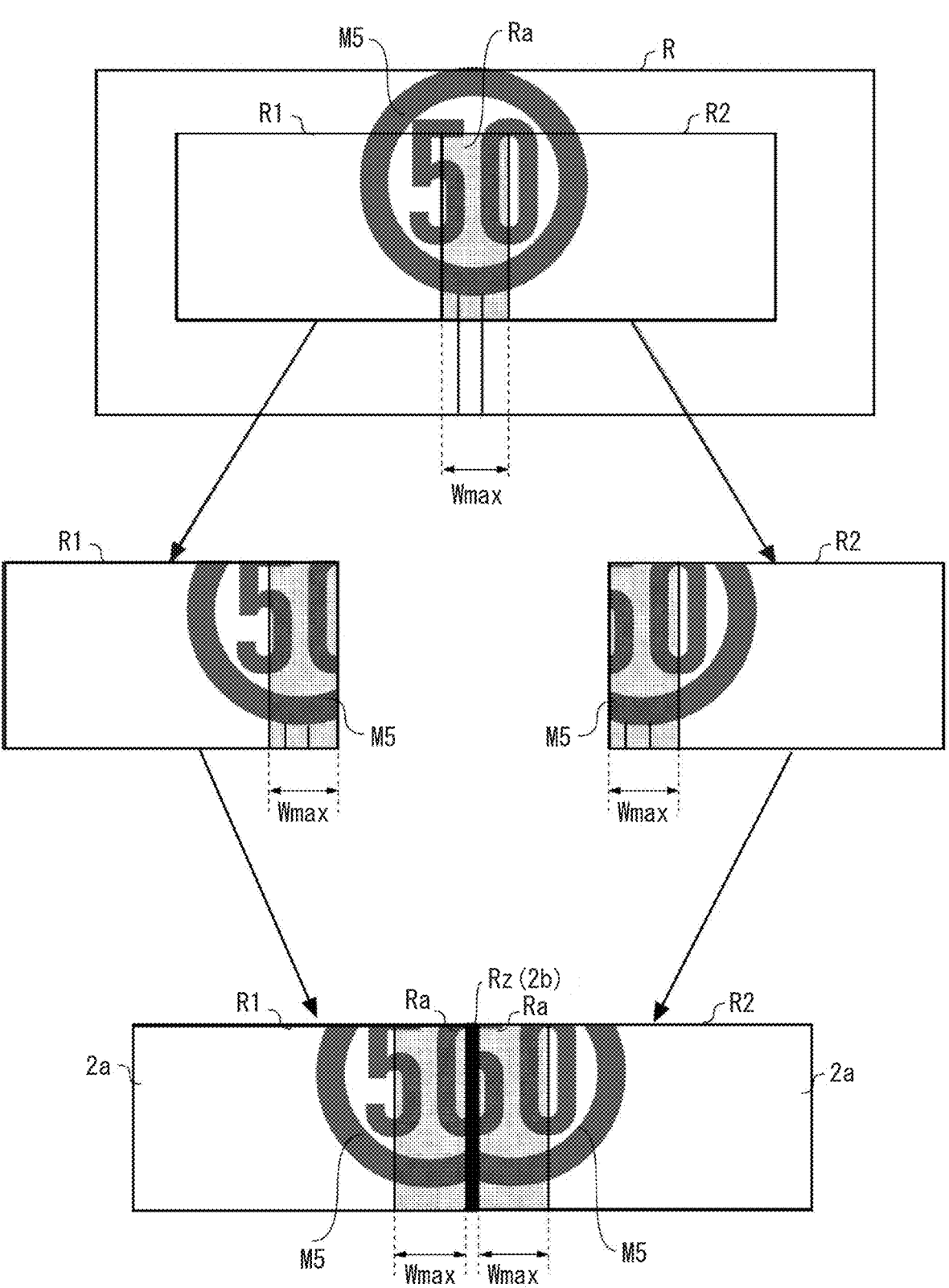
FIG. 15 is part 9 of a diagram of an example of a display mode.

Further, as shown in FIG. 15, when the sign M5 approaches the peripheral camera 23, the sign M5 largely appears in the image content R of the captured image. Then, even when the display processing unit 13 recognizes the image of the sign M5, the width of the sign M5 exceeds the upper limit value Wmax. Therefore, the image is divided by setting the duplication width W to the upper limit value Wmax, and the divided images are output to and displayed on the respective displays 2a. See S1 to S4→S6→S7→S9 to S11 in FIG. 4. That is, as shown in FIGS. 12 to 15, when the sign M5 gradually approaches the peripheral camera 23, the duplication width W gradually increases, but when the width M of the sign M5 increases to the upper limit value Wmax, the duplication width W becomes constant at the upper limit value Wmax.

As shown in the present embodiment, even when the image captured by the peripheral camera 23 is subjected to image recognition and the image-recognized character/symbol information regarding the characters and the symbols included in the captured image subjected to image recognition are treated as the specific content, similarly to the above-described embodiment, the image content R of the duplicated area Ra can be displayed on both of the adjacent displays 2a. Therefore, the same effects as those of the above-described embodiment are obtainable.

Other Embodiments

The present disclosure is not limited to the embodiments described above, but can further be implemented by various modifications, and can be applied to various embodiments without departing from the spirit thereof. When, in the first embodiment, the character/symbol information M1 to M4 (e.g., the town name M4, the facility name M3, the road symbol M2, or the city name M1) is included in the image content R, or when, in the second embodiment, the character/symbol information M5 (e.g., the sign M5) is included in the image content R, the duplicated area Ra is always displayed for the display areas R1 and R2. However, the duplicated area Ra does not necessarily have to be always displayed.

For example, when the display processing unit 13 determines whether or not the character/symbol information M1 to M4 or M5 is included at a position that overlaps with the non-display area Rz in the image content R, and in case that the determination results indicate that the character/symbol information M1 to M4 or M5 is included at the position that overlaps with the non-display area Rz in the image content R, the duplicated area Ra may be displayed only one of the display areas R1 or R2. Further, in the same manner as described above, when the display processing unit 13 determines that the character/symbol information M1 to M4 or M5 is included at a position that overlaps with the non-display area Rz in the image content R, the duplicated area Ra itself may be divided into two at the center or the like, and the divided duplicated areas Ra may be respectively displayed on the two screens, for example, by setting the display areas R1 and R2 to respectively include the divided (i.e., half) duplicated areas Ra. In such manner, unnecessary redundant display can be suppressed, and the display can thus be more easily/readily understood by the vehicle occupant.

Further, as described above, the display processing unit 13 determines whether or not to display the duplicated area Ra by determining whether or not at least one of the character/symbol information M1 to M5 is included at the position that overlaps with the non-display area Rz. In this case, the duplicated area Ra may not be displayed in case that the duplicated area Ra includes only the character/symbol information M1 (for example, the city name M1 in FIG. 10) having a width exceeding the upper limit value Wmax. This is because the width of the character/symbol information M1 is sufficiently large with respect to the width of the non-display area Rz, which is considered as a situation in which the vehicle occupant can fully understand the information indicated by the character/symbol information M1 without providing duplicated display by using the duplicated area Ra. In such manner, unnecessary redundant display can be suppressed, and the display can thus be more easily/readily understood by the vehicle occupant.

The width M of a character or the like to be compared with the duplication width W may be the width of a unitary (i.e., one body) name content, instead of the width of the one character or the width of the one symbol. For example, in the above-described embodiment, the image contents are illustrated as in FIG. 7. In this example, the width M of the one character "T", which is a part of "TOWN E1" in the town name M4, is used as a comparison target. Instead, the whole town name "TOWN E1" may be used as the comparison target width M. Similarly, in case of the contents illustrated in FIG. 8, the width M of one character "R" in the facility name "PARK B" is used as a comparison target. Instead, a whole facility name "PARK B" may be used as the comparison target. The same applies to the road symbol M2, the city name M1, and the like.

In the above-described embodiment, an implementation is shown in which the duplication width W is set for the duplicated display on the horizontally-arranged displays 2a when displaying on multiple displays 2a arranged side by side in the horizontal direction. However, the present disclosure is not limited to the above. For example, as shown in FIG. 1A, there is a non-display area between the multiple displays 2 and 3 arranged in the vertical direction because the displays are separated from each other. Therefore, the duplication width W may also be set when the display screens of these displays 2 and 3 are duplicated and displayed.

In the second embodiment, the sign M5 whose size gradually changes in the image content R is treated as the specific content. However, the present disclosure is not limited to the above. For example, based on an operation of the operation panel 21 by the vehicle occupant to change the scale of the map screen, the display processing unit 13 may generate the image content R with a changed character size and display the image contents on the respective displays 2a with the changed character size. The present disclosure is applicable to this case. That is, even in such a case, by changing the duplication width W of the duplicated area Ra, the same effects as in the above-described embodiment are achievable.

Figure 16:
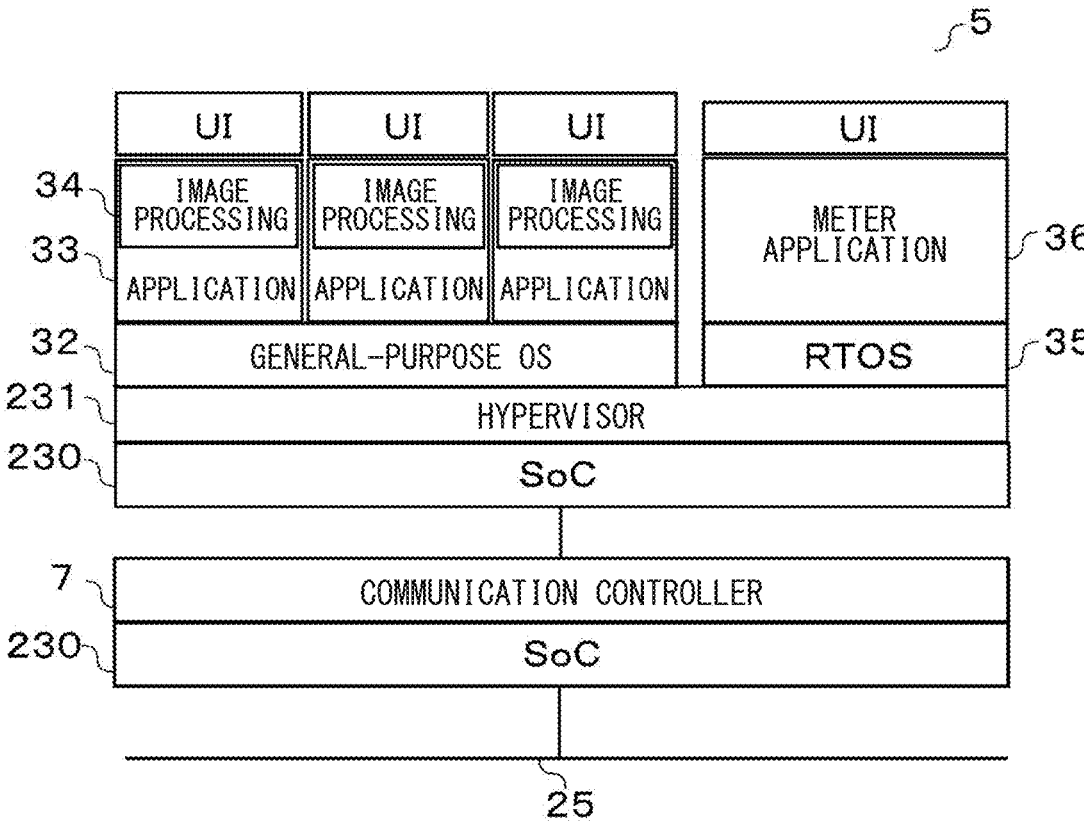
FIG. 16 is a diagram of a configuration schematically showing hardware and software in a modification.

In the above-described embodiment, the display system ECU 5 is configured by a plurality of ECUs 5, but the display system ECU 5 may be configured by one ECU 5 as an HCU. FIG. 16 shows an example of s hardware and software configuration in such a case. An SoC 230 is mounted on each of the ECUs 5, and a microcomputer is built into the SoC 230 mounted on each of the ECUs 5. The microcomputer built into the SoC 230 of the ECUs 5 has the general-purpose OS 32 and the real-time OS 35 configured on a hypervisor 231. The various types of multiple applications 33 are configured to operate on the general-purpose OS 32. Also, the real-time OS 35 can perform processing with higher real-time performance than the general-purpose OS 32. The meter application 36 is configured to operate on the real-time OS 35. Even in such a case, the same configuration and effects as those of the above-described embodiment are achievable.

In the drawing, 2 is a PtoP display, 2a is a display, 2b is a frame (non-display area), 13 is a display processing unit, 13a is a setting unit, 13b is a determination unit, 13c is a duplicated display processing unit, R1 and R2 are display areas, Ra is a duplicated area, and Rz is a non-display area.

The method of the present disclosure implemented by the control unit 11 and the display processing unit 13 may be realized by a dedicated computer provided by configuring a processor and a memory programmed to perform one or more functions embodied by a computer program. Further, the control device 11, the display processing unit 13 and the method of the present disclosure may also be realized by a dedicated computer provided by configuring a processor with one or more dedicated hardware logic circuits. Further, the control device 11, the display processing unit 13, and the method of the present disclosure may also be realized as one or more dedicated computers provided by a combination of (i) a processor and a memory programmed to perform one or more functions embodied by a computer program and (ii) a processor with one or more dedicated hardware logic circuit. The computer program may be stored, as instructions to be executed by a computer, in a computer-readable, non-transitory, tangible storage medium. The present disclosure has been described in accordance with the embodiments. However, it is to be understood that the present disclosure is not limited to such embodiments and structure. The present disclosure covers various modification examples and equivalents thereof. Further, various modes/combinations, with one or more elements added/subtracted thereto/therefrom, may also be considered as the present disclosure and understood as encompassing the technical thought thereof.

What is claimed is:

1. A vehicle display system configured to display a unitary image content on display screens of a plurality of display devices arranged side by side with a non-display area therebetween, the vehicle display system comprising a display processing unit including a processor and memory configured to implement:
   a setting unit configured to, when the image content is to be displayed across the display screens of the plurality of display devices with the non-display area therebetween, set a display area including a duplicated area in which the image content is partially duplicated and to be displayed on the display screens of the plurality of display devices;
   a determination unit configured to determine whether the image content includes a specific content represented by character/symbol information or image-recognized character/symbol information; and
   a duplicated display processing unit configured to, on determination of the determination unit that the image content includes the specific content,
      set a duplication width of the duplicated area based on a width of the specific content, and
      display the image content of the duplicated area on the display screens of the plurality of display devices, wherein
   the duplicated display processing unit is configured to, when the width of the specific content is equal to or greater than an upper limit value of a predetermined width, set the duplication width of the duplicated area to the upper limit value of the predetermined width, and
   the duplicated display processing unit is configured to, when the width of the specific content is equal to or less than a lower limit value of the predetermined width, set the duplication width of the duplicated area to the lower limit value of the predetermined width.

2. The vehicle display system according to claim 1, wherein:
   the duplicated display processing unit is configured to, on condition that the width of the specific content is equal to or less than a predetermined width, set the duplication width of the duplicated area to the width of the specific content.

3. The vehicle display system according to claim 2, wherein:
   the duplicated display processing unit is configured to, on determination of the determination unit that the image content includes a plurality of specific contents including the specific content, set, as the duplication width of the duplicated area, the width of the specific content having a largest width among the plurality of the specific contents.

4. The vehicle display system according to claim 1, wherein:
   the specific content is a character/symbol content represented by the character/symbol information.

5. A vehicle display method for displaying a unitary image content on display screens of a plurality of display devices arranged side by side with a non-display area therebetween, the vehicle display method comprising:
   setting a display area including a duplicated area in which the image content is partially duplicated and to be displayed on the display screens of the plurality of display devices, when the image content is to be displayed across the display screens of the plurality of display devices with the non-display area therebetween;

determining whether the image content includes a specific content represented by character/symbol information or image-recognized character/symbol information;

setting, on determination that the image content includes the specific content, a duplication width of the duplicated area based on a width of the specific content;

setting, when the width of the specific content is equal to or greater than an upper limit value of a predetermined width, the duplication width of the duplicated area to the upper limit value of the predetermined width;

setting, when the width of the specific content is equal to or less than a lower limit value of the predetermined width, the duplication width of the duplicated area to the lower limit value of the predetermined width; and displaying the image content of the duplicated area on the display screens of the plurality of display devices.

6. A non-transitory storage medium storing a vehicle display program to display a unitary image content on display screens of a plurality of display devices arranged side by side with a non-display area therebetween, the vehicle display program including a set of instructions to:

set, when the image content is to be displayed across the display screens of the plurality of display devices with the non-display area therebetween, a display area including a duplicated area in which the image content is partially duplicated and to be displayed on the display screens of the plurality of display devices, determine whether the image content includes a specific content represented by character/symbol information or image-recognized character/symbol information, set, on determination that the image content includes the specific content, a duplication width of the duplicated area based on a width of the specific content, set, when the width of the specific content is equal to or greater than an upper limit value of a predetermined width, the duplication width of the duplicated area to the upper limit value of the predetermined width, set, when the width of the specific content is equal to or less than a lower limit value of the predetermined width, the duplication width of the duplicated area to the lower limit value of the predetermined width, and display the image content of the duplicated area on the display screens of the plurality of display devices.

* * * * *